United States Patent [19]

Relf et al.

[11] Patent Number: 5,017,141

[45] Date of Patent: May 21, 1991

[54] COMPUTING SYSTEM

[76] Inventors: Richard S. Relf, 29 Durrington Gardens, The Causeway, Goring-by-Sea, Sussex; Lawrence G. Marini, 107 South Street, Tarring, Worthing, Sussex; David Parkinson, 104 Sompting Road, Lancing, Sussex, all of England

[21] Appl. No.: 860,974

[22] Filed: May 8, 1986

[51] Int. Cl.$^5$ .............................................. G09B 9/02
[52] U.S. Cl. ........................................ 434/29; 434/30; 434/350
[58] Field of Search ............................ 434/29, 30, 350

[56] References Cited

U.S. PATENT DOCUMENTS

| 4,007,450 | 2/1977 | Haibt et al. | 340/172.5 |
| 4,710,128 | 12/1987 | Wachsmurth et al. | 434/30 |
| 4,715,818 | 12/1987 | Shapiro et al. | 434/350 |

FOREIGN PATENT DOCUMENTS

| 0092895 | 11/1983 | European Pat. Off. |
| 2078407 | 1/1982 | United Kingdom . |
| 2108298 | 5/1983 | United Kingdom . |
| 2112186 | 7/1983 | United Kingdom . |
| 2127997 | 4/1984 | United Kingdom . |
| 2144892 | 3/1985 | United Kingdom . |

Primary Examiner—Edward M. Coven
Assistant Examiner—Jessica J. Harrison
Attorney, Agent, or Firm—David L. Davis

[57] ABSTRACT

A computing system for a flight simulator is formed as a distributed system with a common bus MFB to which five processing modules 11 to 15 are connected. The module 11 processes data relating to aircraft movement and receives data from a pilot's manual controls simulator 16, and supplies data to a motion output unit 17 and a visual field output unit 18. the module 12 processes data relating to engine performance. The module 13 processes data relating to navigation and communciations, and the module 14 processes data relating to aircraft equipment systems such as hydraulic and electrical systems. The modules 12, 13 and 14 may each supply control signals to instruments read by a trainee pilot, and each receive signals from manually operable members or switches operated by the trainee pilot. The module 15 is an instructor station and communicates with a VDU terminal 21. Each module contains, in an interface circuit MFI, a memory which stores data shared by all five modules, the memory being organized so that each module can read any of the data but can only write into a respective allocated region of the memory. The interface circuits MFI each broadcast the contents of their respective allocated memory regions in a predetermined order during a short period at the beginning of each computing frame. Each MFI thus receives the updated contents of the regions allocated to the other MFIs and has an address generator which ensures that the updated contents are written into the correct regions of the memory. Local area networks ML and DL couple the modules 11 to 15 to a management computer MC for program loading and debugging.

14 Claims, 25 Drawing Sheets

COMPUTING SYSTEM

This invention relates to computing systems, and especially, but not exclusively, to computing systems for flight simulators.

For some fifteen years up to the early 1980's, the size of computing systems in general had grown, but they had retained the basic concept of centralised computer and input/output system, and centralised computer systems had been developed to meet the demands of full flight simulators, typical examples being the so-called super-mini-computers such as SEL 32/77, PED 8/32 and DEC VAX 11/780.

The use in flight simulators of centralised host computer complex with an input/output system has been customary for some ten years and whilst significant performance improvement has been achieved, the basic design philosophy has remained the same.

The requirements of a training system for increasingly sophisticated aircraft are continually being extended. Furthermore, additional increased fidelity required by F A A regulations has created problems associated with software development, hardware/software integration and maintenance.

The recent trend has been increased fidelity as perceived by the trainee pilots and increased instructional and support functions. There are "on-board black boxes" that make "critical" decisions that can output completely wrong answers as a result of only slight discrepancies in accuracy and timing of input data. These factors have had the effect of elevating software cost to nearly one-half of the cost of a prototype simulator, while the computer hardware is approximately 1 per cent of the total cost.

The microprocessor offers an attractive alternative to the mini-computer due to a number of significant factors, especially the improved performance cost ratio which allows the microprocessor to be applied to real time computing systems.

Using microprocessors, a flight simulator computing system can, in accordance with the present invention, be partitioned in a manner whereby the total simulator complex can be reduced to a number of small, manageable functions, such as flight, engines, navigation, communication and other systems, which can be made autonomous and in turn can provide improved efficiency during development and availability during normal use. Also, during the life of a simulator major upgrades can be achieved in particular areas without affecting the total complex, especially in view of the lower incremental cost of a microprocessor in comparison with a mini-computer.

Microprocessors can also be applied for the task of debug and diagnostics. This removes customary conflicts with respect to computer resources both off line and during normal real time operation. Instead of attempting to use available spare time for background tasks such as built-in test operations or debug facilities, microprocessors can be dedicated to such tasks, giving improved access to the status of operation. Such resources can also be made more freely available facilitating a very high debug and proof of performance, prior to final integration.

An improved reliability and reduced life cycle cost can also be achieved with a distributed computing system according to the present invention based on microprocessors. First, microprocessors based on very large scale integrated circuits have the capacity of being more reliable than lesser components connected together. The partitioning of the system reduces overall complexity which also leads to improved reliability. A distributed system also becomes more fault tolerant, achieving a state of graceful degradation allowing improved maintenance and testing. All this, together with the low cost modularity of a well designed distributed system, offers a significant reduction in life cycle costs.

The microprocessor based system can permit a continuation of techniques proven necessary by past experience with simulators e.g. the need for hardware floating point.

The synchronisation of software and the integrity of data generated within different systems and organised by different designers have hitherto been a major problem. A multiple microprocessor based system must, at a minimum, not exacerbate this problem.

The introduction of a new system can, in a preferred embodiment of the invention, allow the development, test and enhancements to take place in a high-level language environment using a significantly large number of existing tools and computer facilities. Preferably the microprocessor system modules are compatible with the current Fortran and should not be incompatible with ADA.

In a computing system embodying the present invention for real time flight simulation based upon multiple microprocessors, advanced micro-processors such as the Intel iAPX286, Motorola 68000 or National 16000 can provide the performance to overcome limitations in computer resources which currently lead to development problems and life cycle costs.

The use of microprocessors allows a distributed or modular approach to the design and manufacturing stages and is preferably combined with the use of Local Area Networks. The primary concern in a multi-microprocessor system is the many parallel processes.

Microcomputers are feasible and practical for a complete flight simulator system and have the following advantages:
(1) Total cost is low
(2) Computing power is available in small pieces.
(3)
   (a) Functional partitioning is made possible
   (b) Computer and simulator hardware can be allocated in accordance with the functional partitions.
   (c) Interfaces can be easily defined.

Modules resulting from functional portioning are referred to herein as major functions. A special requirement is an intercomputing-center data-link (bus) of sufficient sophistication. The principle requirement is not bandwidth but the ability to service multiple priorities. Several functions such as initialisation and malfunction control can be distributed throughout the processors.

Computations for each of the major functions of the simulator system are virtually independent of each other, resulting in a surprisingly small amount of necessary sharing of data. The same form of interfacing can be provided for each major function, and can also serve for interfacing the simulator instructional system which does require a more significant amount of data sharing to be carried out.

In a preferred multi-microprocessor distributed computing system for a flight simulator, embodying the present invention, the total system may consist of 2 to 96 microprocessors, operating at 0.5 to 24 million instructions per second, in which all the microprocessors receive timing signals and have access to private memory via a private bus, and are able to read a shared memory without using a shared bus. The real time computing equipment is partitioned on a functional basis and the modules thus formed are referred to as Major Functions. A Major Function Communication Bus provides a high speed path (e.g. 4 million Words/second) between Major Functions to handle time critical data. It does this with a simple hardware/software broadcast system adopting a polled protocol. Each major function of the simulator system may contain from 1 to 6 microprocessors. Each microprocessor cluster constituting a major function has a dedicated input/output system if required. Hardware inputs and outputs are memory mapped.

Each microprocessor (or microprocessor cluster) is provided with:
(a) Executive
(b) Debug System
(c) Initialization
(d) Record/Playback
(e) Malfunction Control
(f) Freeze Control
(g) Module and Frame Timing
(h) Error Message Logic
(i) Input/output Handler
(j) Monitor
(k) Subroutine Library.

Each processor operates within the time frame structure of the simulator, but the microprocessors may have different master rates within this constraint.

Two secondary busses which are based on Ethernet Local Area Network technology are termed the Management Link, which is responsible for program loading, diagnostic reporting and access to a centralised disk system for record replay or loading new data bases, and the Debug Link, which is dedicated for the purpose of debug. Whilst each Major Function has its own debug facility, the Debug Link provides a means of access throughout the functionally distributed system from one particular point.

Each Major Function is autonomous insofar as it contains the processing power, memory and input/output for one function such as flight, engines, etc. Each Major Function includes a number of different busses. These may be as follows:

(i) Sub System Bus
32 bit multiplexed address/data path with up to 16 bus masters.

(ii) Local Memory Bus
32 bit address and data bus dedicated to allow full access by the processor to its local memory.

(iii) I/O Test Link
Each I/O card contains a microcontroller to perform real time monitoring and built-in test facilities. Corresponding messages are sent within a Major Function at 1200 baud along an asynchronous multi-drop serial I/O test Link.

(iv) Linkage Bus
This is a subset of the Sub System bus to provide additional I/O, or Linkage capacity beyond the confines of one card bin.

The major circuit cards making up a Major Function may be as follows:

(i) A microprocessor and dual port memory card for intra Major Function communication.

(ii) A Management Link Processor and to manage information passing between the Major Function and other Major Functions and computers.

(iii) A Debug Link Processor card which is similar to the Management Link Processor card but has an additional VDU/Keyboard interface. This gives each Major Function on autonomous debug capability for increased efficiency.

The Management Link Processor card and the Debug Link Processor card both have high performance microprocessors dedicated to these tasks.

(iv) A Major Function Interface card which is responsible for the storage of shared data generated by all Major Functions, and broadcast of shared data generated by the particular Major Function.

(v) A Function Control and Interface card which provides Sub-System Bus arbitration and termination, and interfaces the Sub-System Bus to the Linkage Bus.

In addition to the circuit cards making up a Major Function, a Simulator Management Computer is preferably included to provide general support of the functionally distributed simulator system. This computer may be an Intel-SYS286/310 microcomputer. Its function is to provide software development tools, maintenance facilities and centralised access to peripherals such as disks. The Simulator Management Computer takes the burden of normal operating system facilities, such as compilers, away from the real time environment, i.e. the Major Functions, and is capable of providing total life cycle support for the simulator system.

A preferred embodiment constructed in the form of a Functionally Distributed Flight Simulator Computing System has the following performance characteristics:

Up to 16 Major Functions
Up to 6 microprocessors per Major Function (iAPX 286/20)
Each microprocessor giving 200-250 KIPS (Fortran ANSI77)
Each microprocessor has 128 Kbytes of memory
A dedicated microprocessor (iAPX186) in each Major Function for debug and diagnostics
Dedicated micro-controller (8051 family) on each input/output circuit card for I/O processing and enhanced performance monitoring
High Speed Major Function Communication Bus
4 MWords/Second
32 Kbytes for shared data in total system, resident in each Major Function
High Speed secondary busses based on Ethernet for enhanced development efficiency and maintenance This basic performance has been shown to meet the requirements of a full range of simulators from a basic trainer to a high performance Full Flight Simulator.

The basic performance can be provided by the Intel family of microprocessors, since an individual microprocessor must achieve around 250 KIPS based on Fortran ANSI 77. Measurements, using special benchmark routines representing Flight Simulation software and which have been used to evaluate a number of mainframe computers were made on 8086+8087 and 80286+80287 microprocessors. These measurements showed that the required performance can be met with the 8 MHZ versions of the 8086+8087 and also with the slightly enhanced 80286+80287 which also provides a greater address range and memory protection for multitasking applications.

The major circuit cards which make up a Major Function in the constructed system are as follows:

(i) Central Processing Unit card:
Intel 80286+80287 µPus
2 JEDEC memory sites
2 Serial ports
3 Counter timers
2×8 level interrupt controllers
(ii) Memory card
128 Kbytes of dual port memory
(iii) Management Link card and Debug Link Processor card:
These two functions are based on the same circuit card type with the debug card having an additional VDU/keyboard interface module.
Each of these cards has:
Intel 80186 µPus
82586/82501 Ethernet controller
4 JEDEC memory sockets
32 Kbytes dual port memory
(iv) Major Function INterface card:
This circuit card couples the Major Function to the Major Function Bus and transfers shared data between Major Functions. There can be up to 16 Major Functions coupled to the Major function Bus which may be 100 foot in length. The rate of data transfer is 4 MWords/second, and there is a total of 32 Kbytes of shared data. The shared data is organized for 128 byte granularity (i.e. minimum amount of memory for which any one Major Function can be responsible, or minimum block length).
The Major Function Interface card has differential line drivers with parity error detection.
(v) Function Control and Interface card:
This is a multi-function circuit card within each Major Function and has
Sub System Bus multi-master arbitration logic
16 Kbytes of common memory
Differential I/O buffer for expansion input/output card bins
(vi) Linkage Cards
A number of input/output cards with associated signal conversion circuitry are provided. All include the following generic characteristics.
Local 8031 µPu
Sub-system bus interface to work with 16 bit and 32 bit microprocessors
I/O test Link at 1.2 Kbaud.
Firmware enables each Linkage card to perform floating point form (32 bit) conversion, discrete bit packing/unpacking, extrapolation, filtering, real time monitoring and closed loop tests and configuration identifiction.
The above concept of local intelligence on all linkage cards and separate, dedicated serial data paths for real time monitoring is not only a proven feature but also a very important preferred characteristic of Functionally Distributed Simulation in accordance with the present invention.
Much of the software development is based on the use of Intel SYS 286/310 computers running under the RMX 86 operating system. Fortran is the main language for special routines associated with executives and diagnostics. Of particular interest is the ease with which existing software tools coded in Fortran, available on mainframe computers, can be edited and compiled into the Intel environment. This is an extremely efficient process and is also applicable to application modules for various flight simulator configurations.
The principal software systems are:

(i) Real Time
Executive (Scheduler and Linkage Driver)
Local Area Network protocol and drivers
Subroutine library
(ii) On Line Tools
Symbolic debug
On-line diagnostics, performance monitoring and high level confidence checks
Error logging
(iii) Off Line Support
Symbol Dictionary
Fortran Scan and Cross Reference facility
Diagnostics for system exercisers, Maintenance and Test and Daily Readiness The invention will now be described by way of example with reference to the accompanying drawings in which.

Figure 1:
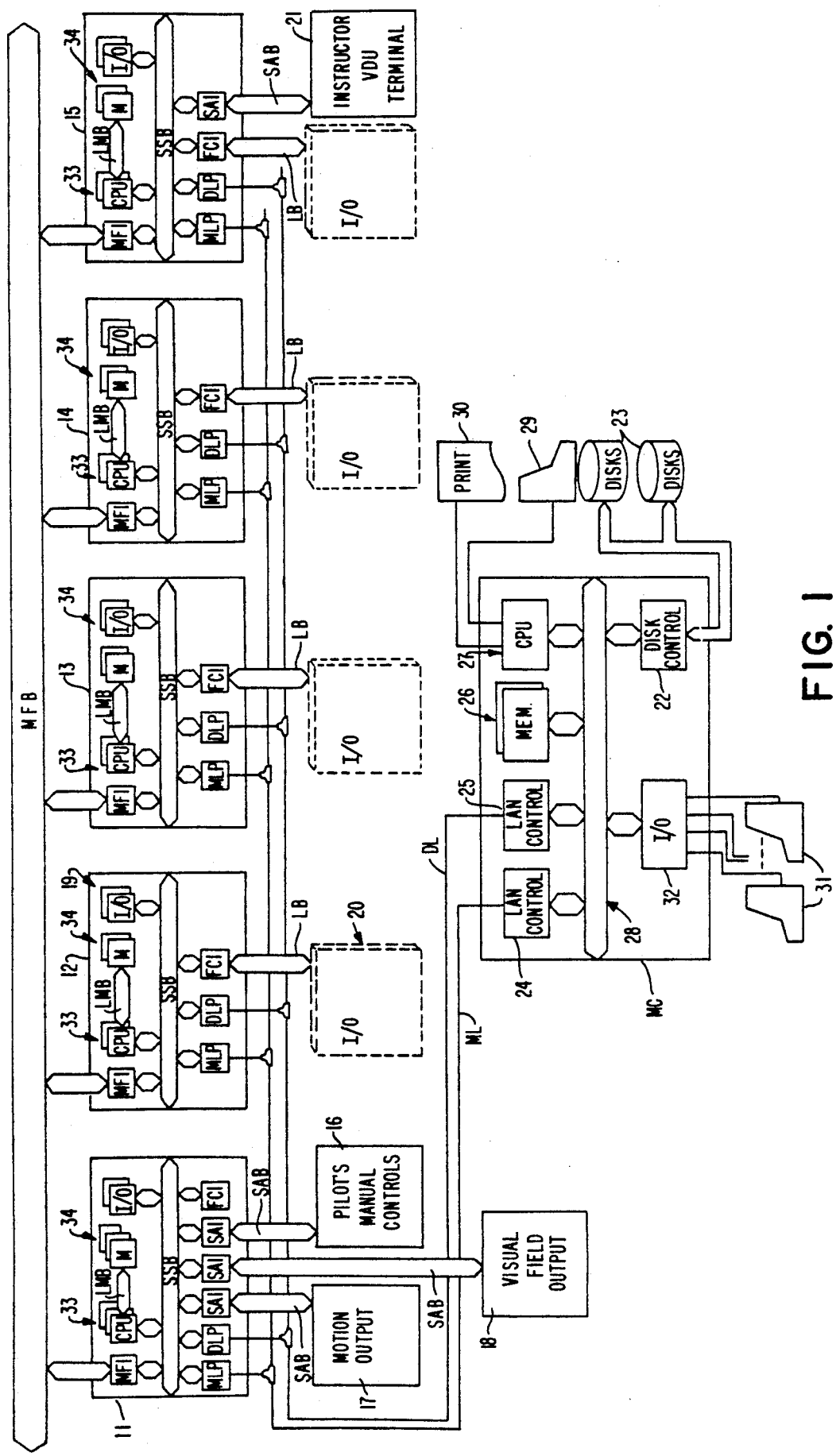
FIG. 1 is a block diagram of an aircraft simulator embodying the invention.

FIG. 1 of the drawings illustrates schematically an aircraft simulator in which the data processing hardware is divided into five modules, referred to herein as major functions, which are coupled, for the exchange of shared information, by a bus MFB, referred to as the major function bus, and is serviced by a management computer MC coupled to each of the five modules by two local area networks (LANs), referred to as the management link ML and the debug link DL.

The five data processing modules are the flight major function 11, the engines major function 12, the navigation and communications major function 13, the systems major function 14, and the instructor operation station major function 15.

The flight major function 11 receives input data from the simulator manual controls input and output 16 which includes a control column, pedals, nosewheel steering handle and toe brakes provided for a trainee pilot in a simulated aircraft cockpit. The simulator manual controls input and output 16 includes apparatus which converts the movement of the hand and foot controls (not shown) into digital data transmitted over a respective stand alone bus SAB to a respective stand alone interface SAI in the major function 11. In response to this manual controls data and to other data the flight major function 11 generates motion control output data which it supplies through another respective stand alone interface SAI and stand alone bus SAB to a motion output 17 in the form of an electro-hydraulic apparatus for moving the simulated cockpit in a manner simulating the effect of operation of the hand and foot controls and other circumstances such as take off, landing, acceleration and air turbulence. The motion drive and safety circuits are housed in a motion cabinet 17. The manual controls input and output 16 also includes mechanical actuators for varying the resistance of or moving the control column and other mechanisms in response to computed flight or other conditions.

To simulate the changing scene that would present itself to the pilot flying a particular course from take off at one known airport to landing at another known airport, a visual display replaces the windows in the simulated cockpit and is driven by a visual field output 18 which is a moving image display generator which receives from the flight major function 11, acting as host computer, aircraft position and attitude data, which is transmitted to the visual field output 18 by a third stand alone interface SAI over a third stand alone bus SAB.

Apparatus which can be used as the simulator manual controls input and output 16, the motion output 17 and the visual field output 18 is well known to those skilled in the art and will therefore not be described in more detail.

The engine major function 12 generates data representing the response of the engines of the simulated aircraft to input from a throttle lever (not shown) and various switches provided in the cockpit, and to data representing factors such as atomospheric conditions and malfunctions of equipment systems serving the engines. The throttle lever is coupled to a position transducer (not shown) connected to an internal input/output unit 19 of the major function 12. The various switches and associated visual indicators are coupled to the engines major function 12 at the internal input/output unit 19 and, if necessary, at an external input/output unit 20 coupled to the major function 12 through a bus LB, referred to herein as a linkage bus, to a function control and interface unit FCI. The data generated by the major function 12 includes data representing engine conditions such as thrust gas temperature, rate of fuel use and oil pressure, for which indicators may be provided to be driven from the internal input/output unit 19. Data representing equipment system malfunctions affecting engine operation are supplied to the engines major function 12 by the systems major function 14 during a regular updating process involving all five major functions 11 to 15 and utilizing the major function bus MFB. Another indicator driven by the unit 19 shows changeover from battery to generator at a computed appropriate rate of engine operation.

The navigation and communications major function 13 receives from the flight major function 11, during the regular updating process via the major function bus MFB, three dimensional coordinate values specifying a computed aircraft position in a coordinate system having its origin at an arbitrary starting point, and generates from this the simulated aircraft position in longitude, latitude and height. The flight major function 11 also supplies, in the same way, aircraft attitude data. The navigation and communications major function 13 includes an internal input/output unit which drives indicators representing primary navigation display instruments such as an artificial horizon, an attitude and direction indicator, and magnetic compasses. Other indicators driven by the internal input/output unit may include indicators for showing aircraft position relative to radio beacons, data for the radio beacons being down loaded at suitable times from the management computer MC via the management link ML to a management link processor MLP in the major function 13, and indicators showing aircraft position relative to a landing radar glide path at a destination airport. Simulated VHF and UHF communications equipment is provide in the cockpit and is coupled to the navigation and communications major function 13 at the internal input/output unit. If necessary, an external input/output unit may be provided coupled to the function control and interface FCI of the major function 13 through the linkage bus LB. The major function 13 generates background noise and chatter for the simulated communications receivers which may, for example, relay pre-recorded air traffic control messages or live messages simulating various situations from an instructor at the instructor operation station (IOS) major function 15.

In an alternative configuration of the system, the navigation and communications major function 13 includes a stand alone interface SAI which drives the visual field output 18, instead of the latter being driven from the flight major function 11. This alternative may be preferred since the visual field output 18 uses the latitude and longitude data generated by the navigation and communications major function 13. In the present example, there is a slight delay in the availability of the current latitude and longitude data to the visual field output 18 since this data is transferred to the flight major function 11 from the navigation and communications major function only during the regular updating process via the major function bus MFB.

The systems major function 14 generates data representing the behaviour of equipment systems such as hydraulic and/or electrical systems for operating control surfaces of the aircraft, landing gear, cabin pressurisation, de-icing, powered movable military equipment, and pumps, and, if not generated by the engine major function 12, the fuel system. This major function 14 has an internal input/output unit and, if necessary, an external input/output unit which is coupled through a linkage bus LB to its function control and interface FCI, which read inputs from the switches (manual circuit breakers) associated with the equipment systems, and drive indicators showing conditions of these systems. In generating the data representing the behaviour of the equipment systems, full account is taken of the known characteristics that switch on and switch off of the real systems which are being simulated.

The IOS major function 15 includes a stand alone interface SAI coupled through a stand alone bus SAB to an instructor's visual display unit and terminal 21 to allow an instructor to alter data being processed by any of the four other major functions 11 to 14. An internal input/output unit is includes in the major function 15 to allow indicators showing operating conditions of the system to be driven and to allow inputs such as recorded or live messages to be entered. An external input/output unit may also be provided if necessary, coupled through a linkage bus to the function control and interface FCI of the major function 15. An instructor can also communicate with the management computer MC from the terminal 21 via a management link processor MLP of the major function 15 connected to the management link ML, for the purpose of commanding data to be unloaded from disk at the management computer MC and loaded into any designated major function through the management link ML, each major function including a respective management link processor MLP connected to the management link ML.

The management computer MC, in addition to having a disk controller 22 controlling two disk drive units 23, and two local area network controllers 24 and 25 controlling input to and output from the computer ML to the management link ML and the debug link DL, includes a memory 26, a central processor unit 27 and a main bus 28 coupling all these elements as indicated. A visual display unit and terminal 29 is provided for direct communication with the CPU 27, and a line printer 30 may be driven from the CPU 27. Further terminals 31 may be coupled to an input/output unit 32 in the computer MC.

Programs for the major functions 11 to 15 are stored on disk at the drive units 23 and are loaded from disk into the major functions 11 to 15 before the simulator is used by a trainee pilot and an instructor to carry out a simulated flight from a defined starting point to a defined end point in a defined aircraft. The management link ML is used for such loading. The terminal 29 is used for controlling such loading operations, and can be used for amendment of existing programs and creation of new programs. For debugging programs under test, i.e. when loaded into the major functions 11 to 15, the terminal 29 can communicate with any major function through the debug link DL which is connected to a respective debug link processor DLP in each major function.

Each of the major functions 11 to 15 includes a central processor unit 33 with an associated memory unit 34 accessed by the CPU 33 through a local memory bus LMB. Alternatives to this arrangement are that the CPU 33 accesses the memory unit 34 through a main bus SSB, referred to herein as the sub-system bus, present in each major function, or that the CPU 33 includes sufficient memory for the memory unit 34 to be dispensed with. The CPU 33 may consist of six microprocessor cards which are connected through the local memory bus LMB to six memory cards.

A function control and interface FCI is provided in each major function and serves to generate clock pulses and to perform bus arbitration and bus termination for the respective sub-system bus SSB. It includes a block of RAM and a configuration EPROM for use by the management link processor MLP and the debug link processor DLP. For input and output functions, the FCI includes differential buffers coupling a subset of the sub-system bus SSB to input and output circuitry.

Each stand alone interface SAI includes a microprocessor allowing intelligent, i.e. programmed, interfacing between the respective major function and the external unit coupled by the respective stand alone bus SAB.

The internal input/output units in each major function consist of a number of circuit cards each having a microprocessor for intelligent interfacing.

In other embodiments similar to the present example, two major functions may require to work closely together, and for this purpose may each include a stand alone interface SAI, these two interfaces SAI being connected in a back-to-back configuration to allow direct communication between the two major functions.

The memory unit 34 of each major function is initially loaded with a program for that major function from the management computer through the management unit ML, and has capacity for all the computing required to be carried out by the major function, i.e. the memory unit 34 is the data processing memory of the major function.

Some of the data generated by each major function is needed by one or more of the other major functions. The total of such shared data is referred to herein as the total cross talk data. Each major function is provided with a special memory, referred to as the cross-talk memory, in which the total cross talk data is stored. The total cross talk data is updated at regular intervals by broadcasting of cross talk data over the major function bus. This is the regular updating mentioned hereinbefore. It is customary in aircraft simulators to carry out processing in regular steps, known as frames which are equal short intervals of time, the conventional frame duration being one thirtieth of a second. In the present simulator, the CPU 33 of one of the major functions 11 to 15 is designated master CPU in the simulator and generates a start of frame signal at the beginning of each thirtieth of second. The stare of frame signal is received in a major function interface MFI of that major function and triggers the broadcasting of cross talk data from each major function in turn through the major function bus MFB to all the other major functions. The broadcasting of cross talk data is completed within four milliseconds, leaving about twenty nine milliseconds for the major functions to utilize the updated total cross talk data in each frame.

Each major function has a major function interface MFI and its cross talk memory is part of its major function interface MFI. Control signals from the major function interface associated with the master CPU, and further control signals from the other major function interfaces are also transmitted over the major function bus MFB.

The cross talk memory of each MFI is organised in the same way, defined exclusive areas being allocated to the cross talk data generated by the different major functions. So that malfunctions or other conditions which may be present or not can be inserted by an instructor while the system is running, much of the cross talk data in the area allocated to the IOS major function cross talk in the cross talk memories is in the form of flags indicating presence or absence of the respective malfunctions and conditions, and the individual programs of the other major functions 11 to 14 include monitoring of the state of the relevant flags. For example, the instructor can insert an engine failure, during running, thereby setting a fail/not fail flag to the fail state in the cross talk area allocated to IOS data, and at the next broadcast of cross talk data which updates the IOS data in the cross talk memory of the engines major function 12, the same flag there will be set to the fail state so that the CPU 34 of the major function 12 will sense the fail state in its programmed monitoring of the IOS area of its cross talk memory. Also, the IOS area contains initial values for various parameters, such as staring position and height of the aircraft, which can be inserted by the instructor before the system begins a run. One input to the IOS major function 15 is a "total freeze" button which, if pushed during a run, sets a flag for "total freeze" in the IOS data area of the cross talk memory of the MFI of major function 15, and, after the next updating of all cross-talk memories, all the other major functions 11 to 14 halt operation on detecting that the total freeze flag is set.

the main concept of the functionally distributed simulator (FDS) is division of the overall simulation task into a number of specific areas allocated to major functions MF.

Analysis is undertaken to ensure that this split results in minimum interaction being required between them. Fortunately, typical requirements for a flight simulator have well-defined boundaries that ease the choice of that split.

The amount of interacton between major functions, measured in terms of total cross talk (variables generated by one MF and required by other MFs), is remarkably small. A Boeing 747 simulator, for instance, is shown to require only about 8 K bytes.

the architecture of the system of FIG. 1 can be regarded as a hierachy of bus being tailored for a specific task.

The primary bus is the major function bus MFB which is a parallel path used for transmitting total cross talk between the major functions.

The two secondary busses, the management link ML and the debug link DL, which each go to all MFs are, unlike the major function bus, serial paths and also go to the Management Computer MC. Small simulator systems may not require both, or either of these links.

The next level down in the hierarchy of busses is the sub-system bus SSB. This is the backplane bus of each major function. All circuit cards in an MF are on the SSB.

The local memory bus LMB allows a processor card to communicate with a RAm or PROM card without having to use the SSB. The LMB is dedicated to a particular CPU.

There are two cases when data needs to be transmitted from the SSB to an area outside the MF card bind. First, if more I/O cards (circuit cards in an input/output unit) are required than will fit into one bin then extra I/O bins (making up an external input/output unit) must be interfaced; this is done via the linkage bus LB. Secondly, when a 'stand-alone' system needs to be driven a stand alone bus SAB is used.

All I/O cards have local 'intelligence ' built-in and hence they can perform their own status checks. A serial bus is built into the backplane of each MF to allow status information to be gathered from one point.

Maximum use is made of programmable LSI/VLSI integrated circuits. These components typically interface to a micro over a parallel data path. This 'Component Bus' is the lowest Bus Level in the architecture.

The Major Function Bus MFB is used only for the transmitting of the shared data referred to herein as cross talk, and associated control signals between major functions. The transfer is done on a broadcast basis at the start of every frame. Each major function interface MFI has high speed logic which performs the broadcast of its data to all other MFs, and then releases control to allow the next MF to do the same, and so on.

Each MFI therefore, holds a copy of the entire simulator's cross talk which is up-dated at the beginning of each frame.

The MFB is preferably a single ribbon cable, comprising twenty-five twisted pairs. It may be up to one hundred feet long and support up to sixteen major functions. The transfer rate is four million words (16 bit) per second.

THe management link ML is implemented as an Ethernet serial link which is a high speed (10 M bits per second) local area network (LAN).

The ML is used for program loading from disc, diagnostics reporting, access of IOS page and radio-station data from/to disc, and, for record/replay.

The debug link DL is also implemented as an Ethernet serial link.

The DL is used for 'look and enter' across MFs, Symbol Dictionary references from disc, Debug page access to/from disc, and hard copy from screen to lineprinters. This card may not be necessary in small systems.

The controllers 24 and 25 in the management computer MC are accordingly Ethernet controllers.

Each major function is a self-contained multi-processing system based around a multi-master bus, the sub-system bus SSB, which is implemented as a thirty-two bit multiplexed address and data path and is limited to a single card bin backplane. This sub-system bus SSB can be contained within a 96 way DIN connector P1 used with the extended double eurocard format pcbs. Up to sixteen bus masters are allowed, six CPUs, the MLP, the DLP, and eight others. All circuit cards within an MF reside on the SSB which is the communication path for transfer of data between microprocessors in a major function.

A sub-set of the SSB is defined to allow connection of a major function circuit card bin to one or more input-/output unit (I/O) card bins. The buffer circuitry to do this is resident on the Function Control and Interface card FCI. The linkage bus LB connects the FCI to the one or more I/O card bins. The I/O cards area always SSB slaves, i.e. they can only be read from or written to. The linkage bus LB, therefore, allows only 'slave' cards to be used. The I/O card bin(s) may be local to or remote from the MF card bin.

The stand alone bus SAB interfaces systems such as the visual field output 18, weather radar, sonar, and the instructor's terminal 21 which can require blocks of data to be transferred in either direction at relatively high rates, to a major function.

Each stand alone bus SAB is controlled by a stand alone interface card SAI which may be designed to emulate a Gould SEL HSD controller to be compatible with systems which use an High Speed Data (HD) interface. In addition a stand alone bus may be driven by two stand alone interface circuits in a back-to-back configuration allowing fast data transfers between two major functions. The stand alone interface is a bus master on the sub-system bus SSB of a major function and hence must reside in the major function circuit card bin, not an I/O card bin.

Each I/O circuit card has its own eight bit micro on-board with an associated serial port (UART). That UART is used to receive/drive an I/O test link ITL (not shown) which is a multi-drop serial link controlled by the management link processor MLP of the respective major function. The MLP polls each I/O card and allows the I/O cards to transmit status information. Although the ITL is built into the backplane of the major function card bin, cards in any I/O card bins connected by the linkage bus LB are still accessible for status requests.

the central processor unit CPU of each of the major function 11 to 15 may consists of six microprocessors each on a circuit card, the presently preferred microprocessor type being the Intel 80286. In a modification, the separate memory unit 34 is omitted and each CPU card has included on it a dual port RAM of sufficient capacity.

The memory unit 34 of each major function may consist of six circuit cards each having a 128 K byte dual-port memory.

The local area network controllers 24 and 25 in the management computer MC, where the management link and debug link are Ethernet links, each includes an Ethernet controller. In simpler embodiments, the debug link and associated circuitry may be omitted. Also, in an embodiment having a restricted library of routines, the whole management computer MC and the management and debug networks are omitted, programs being permanently or semi-permanently loaded into the major functions in PROMs.

Where present, the management link processors MLP in the major functions can serve as the sources of an initialisation signal when the system is powered up, this signal setting the respective major function interfaces MFI in an initial condition. All the management link processors MLP and the debug link processors DLP contain respective Ethernet controllers for Ethernet networks. A block of RAM and a configuration EPROM may be included in each function control and interface FCI for use by the Ethernet networks.

The structure and operation of one major function interface MFI and its interaction with the other major function interfaces through the major function bus MFB will now be described in more detail. The hardware for each major function interface MFI is identical, but only one is set in a condition to act as a master controlling the time of broadcasting of cross talk data.

Figure 2:
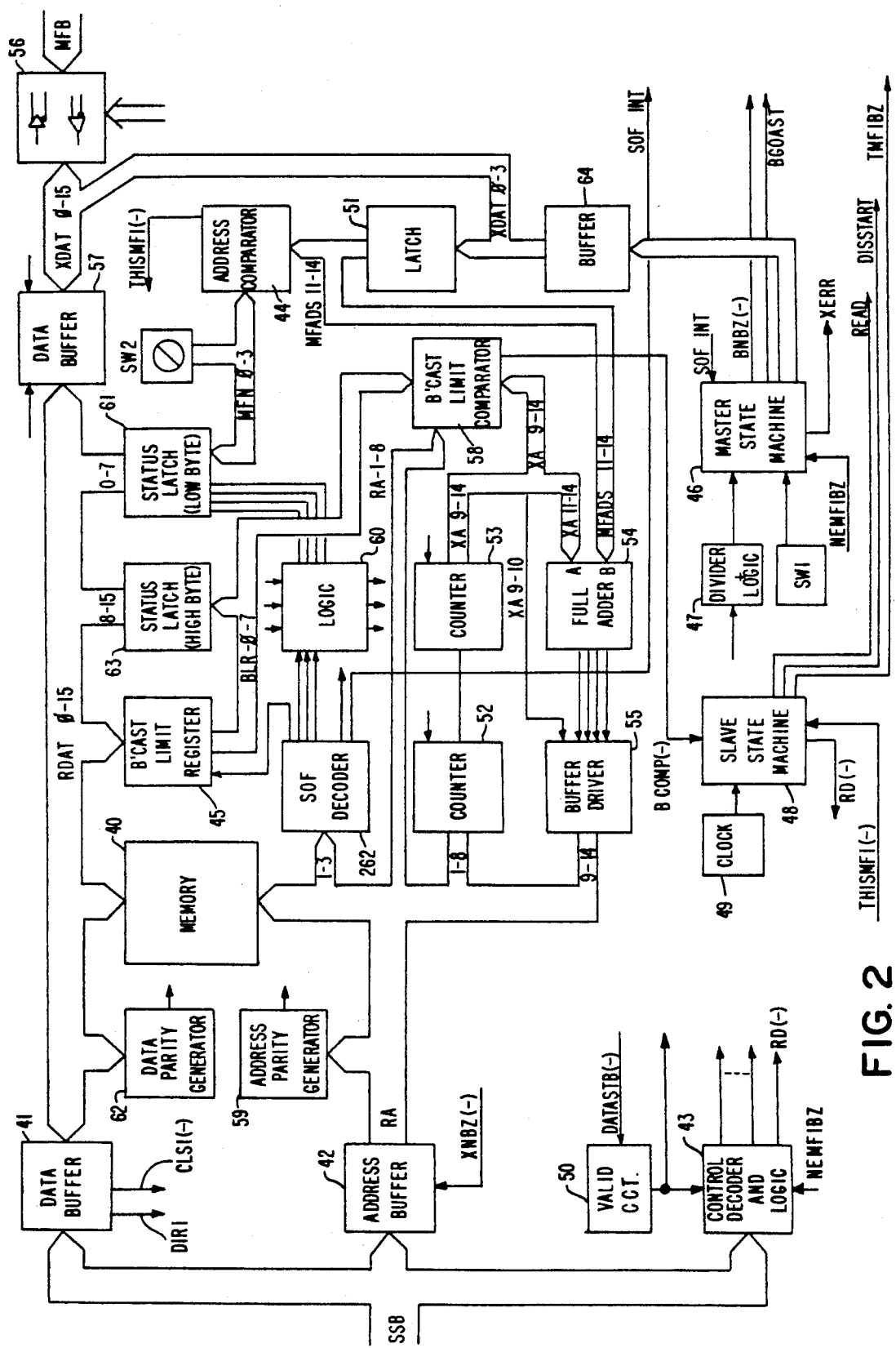
FIG. 2 is a block diagram of an interface used in the simulator of FIG. 1.

FIG. 2 illustrates in block form the principal functional components of a major function interface MFI. The MFI is connected to the sub-system bus SSB and to the major function bus MFB by means of suitable multi-pin connectors.

The total cross talk memory 40 is connected to an internal data bus RDAT and an internal address bus RA. Microprocessors within the major function can obtain access to the cross talk memory 40 from the sub-system bus SSB through controlled data and address buffers 41 and 42 respectively coupling SSB to RDAT and SSB to RA. Address signals from the sub-system bus SSB can reach the memory 40 only when a signal XNBZ(−) is active. This signal is active when low, i.e. it is a low active signal, as indicated herein by (−). High active signals, i.e. signals active when high, are indicated herein by mnemonics which are not followed (−). Data signals from SSB can reach the memory 40 only when a control logic signal CLS1(−) is active, and a direction control signal DIR1 is such as to set the data buffer 41 for transferring data from the SSB to RDAT, this buffer 41 being a two-way buffer. The signals CLS1(−) and DIR1 are developed by a control decoder and logic unit 43 connected to the SSB and coupled through buffers (not shown) to the MFB. Control signals on the SSB indicate when the major function microprocessors wish to access the memory 40, but access through the data buffer 41 is allowed by the control decoder and logic unit 43 only while there is no broadcasting of data on the MFB. Similarly, the signal XNBZ(−) which controls the address buffer 42 is a control signal derived from the MFB and is active when data is not being broadcast over the MFB, XNBZ being a mnemonic for cross talk not busy.

In the preferred embodiment, the total cross talk memory 40 has a capacity of 32 kilobytes and is implemented as a matrix of four 8192×8 bit RAMs adapted for addressing 2-byte words. Separate defined areas, each of a minimum of 64 words and all being either 64 words or an integer multiple of 64 words, are allocated to be written into respectively by exclusively one of the major functions. Thus in the present example the memory 40 has five distinct areas each one of which can be written into only by a respective one of the five major functions 11 to 15. The most significant part of the address of the first word in such an allocated area is used as the address of the respective major function for the purpose of broadcasting of data over the major function bus, and is therefore set manually in a four bit switch SW2 connected by a major function number bus MFN to an address comparator 44. Also for the purpose of broadcasting, the size of the area allocated to the respective major function is set as a number loaded into a "broadcast limit" register 45. The loading of the broadcasting limit register is normally an operation carried out before use of the system, and can be effected through the internal data bus RDAT. Microprocessors in the respective major function which have access to the memory 40 over the SSB are of course programmed to write only into the allocated area for that major function, but are able to read from any location in the memory 40 which contains data required by these microprocessors.

During each updating of the total cross talk memories, which occurs in the first four milliseconds of each frame, the addresses of the major functions are placed on the major function bus MFB one after another in a predetermined order. In the present example, this is done by a master state machine 46 activated in one of the major function interfaces MFI chosen as master by the manual setting of a switch SW1 connected to the master state machine 46 of that major function interface MFI. The activated master state machine 46 responds to a control signal SOF, generated at the start of each frame from control signals issued over the sub-system bus SSB by the microprocessor designated master, by generating one after the other in synchronism with selected timing pulses from a divider and logic unit 47 all the partial addresses of the lowest locations of the sixteen blocks of 1024 words areas making up the total 32 kilobytes of memory starting with the lowest of these addresses. Each such partial address consists of the four most significant bits of the full address. Five of these addresses are the addresses of the five major functions 11 to 14 for broadcasting purposes. Whenever one of the five major functions receives its broadcasting address over the major function bus, it issues a control signal TMFIBZ, this major function interface busy, which passes onto the major function bus MFB through a buffer not shown in FIG. 2. The activated master state machine receives from MFB a signal NEMFIBZ corresponding to TMFIBZ and, in response, pauses in tis generation of addresses until the signal NEMFIBZ goes low, indicating that the major function which was emitting the signal TMFIBZ has completed broadcasting of the contents of its allocated area of cross talk memory from its own total cross talk memory 40.

The signal TMFIBZ is generated by a slave state machine 48 driven by an 8 megahertz crystal controlled clock 49, which also drives the divider part of the divider and logic unit 47. Any slave state machine which is carrying out its broadcasting operation generates, in addition to the signal TMFIBZ and other control signals, a read command signal READ which is placed on the major function bus through a buffer not shown in FIG. 2 and is received in all other major functions as a control signal DATASTB(−) from which a write enable signal to the memory 40 of each of these other major functions is developed by a validating circuit 50 and the control decoder and logic unit 43.

Each major function interface MFI includes an address generator consisting of a latch 51, two counters 52 and 53, a full adder 54, an address generator bus XA coupling the counter 53 to the full adder 54, a major function address bus MFADS coupling the latch 51 and the full adder 54, and a buffer/driver 55 receiving two lines from the address generator bus XA and the output of the full adder 54. The carry output of the counter 52 is connected to the clock enable input of the counter 53, and the outputs of the counter 52 and the buffer/driver 55 are connected to the internal address bus RA so that the counter 52 drives the least significant address bits and the buffer/driver 55 drives the most significant address bits. Whenever the major function interface is receiving data from another major function, the clock signal supplied to the counters 52 and 53 is the validated version of the signal DATASTB(−) and is coupled from the validating circuit 50. Thus the READ signal of the broadcasting major function is used to clock the counters 52 and 53. The major function address currently broadcast by the master state machine 46 of the master major function is latched by the latch 51 and serves as the four most significant digits of the address generated by the address generator. It will be seen that the latch 51 receives its input from four lines of a cross talk data bus XDAT which connects a set of input and output differential buffers 56 to a broadcast data buffer 57, the differential buffers 56 coupling the cross talk data bus XDAT to the major function bus MFB, and the broadcast data buffer 57 coupling the cross talk data bus XDAT to the internal data bus RDAT. By using the READ signal of the broadcasting major function to clock the counters 52 and 53, adding the outputs of the counter 53 to the latched major function address, and driving the internal address bus RA with the outputs of the buffer/driver 55 and the counter 52, the addresses generated correspond to the addresses in the total cross talk memory from which the data being received over the major function bus MFB and through the buffers 56 and 57 orginates. Thus the area allocated to the broadcasting major function in the total cross talk memory 40 of each receiving major function interface MFI is updated.

The major function address bus MFADS also connects the latch 51 to the address comparator 44 which compares the latched address with the address set in the four bit switch SW2. If these two address match, the comparator 44 generates an active control signal THIS MFI (−) which is supplied to the slave state machine 48. The slave state machine responds by cycling through a number of states in a predetermined order, in synchronism with clock pulses from the clock 49. During this cycle of states, the slave state machine generates the signal READ to produce a write enable signal and address clocking signals in the MFIs of the other major functions, a control signal DISSTART which is used to control differential buffers connected to the major function bus and to set the direction of data transfer at the buffer 57 which is a two way buffer, the signal TMFIBZ to cause the master state machine in the master MFI to pause at the current major function address, and a low active read enable signal RD(−) which it supplies to the control decoder and logic unit 43 to cause a read enable signal to be applied to the memory 40. The generation of TMFIBZ inhibits the reception of DATASTB(−) in the MFI having the cycling slave state machine 46. However, addresses are generated as described hereinbefore by its address generator, with the difference that the clock signals for the counters 52 and 53 are in this case the read enable signal RD(−). The slave state machine 48 resets to its idle condition on receiving a control signal BCOMP(−) indicating that broadcasting of cross talk data from the allocated cross talk memory area of this major function is complete.

The signal BCOMP(−) is generated when a "broadcast limit" comparator 58 senses a match between a number related to the address being supplied to the memory 40 and a number stored in the broadcast limit register 45. To carry out its comparison operation, the broadcast limit comparator 58 is supplied at one set of input pins with the number stored in the broadcast limit register 45 over a broadcast limit bus BLR, and at another set of input pins with part of the address on the internal address bus RA and the output of the counter 53.

The internal address bus RA is connected to an address parity generator 59 which generates a one-bit parity signal corresponding to the parity of any address on the internal address bus RA. If the slave state machine 48 is carrying out its cycle of operations to broadcast the cross talk data of the major function concerned, the parity signal is transmitted to each of the other major function interfaces over the major function bus MFB where it is compared in a logic unit 60 with the parity signal generated by the respective address parity generator 59 in response to the address being generated there by the address generator of the receiving major function interface. If the compared address parity signals in a major function interface do not match, the logic unit 60 develops a parity error signal which sets a bit in a low byte status latch 61 connected to the internal data but RDAT, and results in an interrupt signal SYSFAIL (not shown in FIG. 2) being supplied to the sub-system bus for action by a major function microprocessor which can read the low byte status latch 61. Similarly a data parity generator 62 is connected to the internal data bus RDAT and generates a parity signal which, in the case of an MFI with an active slave state machine, is broadcast over the MFB to each of the other MFIs, where it is compared with the locally generated parity signal by the logic 60 which accordingly develops a signal indicating whether or not there is a data parity mis-match. This signal is stored in the respective low byte status latch 61 and results in a SYSFAIL interrupt if there is a mis-match.

The low byte status latch 61 also stores the major function address, being connected to the major function address bus MFN. THe remaining two bits in the latch 61 are determined by the status of two test condition signals which may be entered from the sub-system bus SSB through the address buffer 42, internal address bus RA, a three-to-eight decoder referred to herein as the SOF decoder 262, and the logic unit 60.

A high byte status latch 63 connected to the internal data bus RDAT is set by the contents of the broadcast limit register 45, being connected to the broadcast limit bus BLR.

The major function acting as master generates an address on the sub-system bus SSB at the beginning of each frame which address results in the SOF decoder 262 producing a start of frame interrupt signal SOF INT which is supplied to the master state machine 46 of the major function and to the major function bus MFB for communication to the respective sub-system buses of the other major functions. On receiving the signal SOF INT, the activated master state machine 46 enters its active cycle of thirty two states. Whilst thus active, the master state machine 46 generates the series of sixteen partial addresses, five of which are major function address, which it supplies to a buffer 64 connected to four lines of the cross talk data bus XDAT for transmission to the major function bus MFB through differential buffers in the set 56. The machine 46 also sets a control signal BNBZ(−) high, thereby indicating that broadcasting is taking place, this low active signal BNBZ(−)

in its active state indicating that broadcasting is not taking place. At this and the other major function interfaces, the signal BNBZ(—) generates from the major function bus the corresponding signal XNBZ(—). Hence when the master state machine 46 is active, the address buffers 42 in all major function interfaces are inhibited. Each time the master state machine 46 issues a new major function address, it also generates an address strobe signal BGOAST which generates, through the major function bus MFB, a corresponding strobe signal GOASTB (not shown in fIG. 2) in every major function interface MFI. This strobe signal is used to enable the latch 51 and some of the buffers in each MFI.

The master state machine 46 includes a timer which starts in response to the interrupt signal SOF INT, and runs out after 5 milliseconds. If the signal NEMFIBZ is still active after this 5 milliseconds, the broadcasting of data on the major function bus MFB has continued beyond the normal time, and the master state machine 46 issues an error signal XERR to the logic unit 60 which responds with the signal SYSFAIL.

Figure 3:
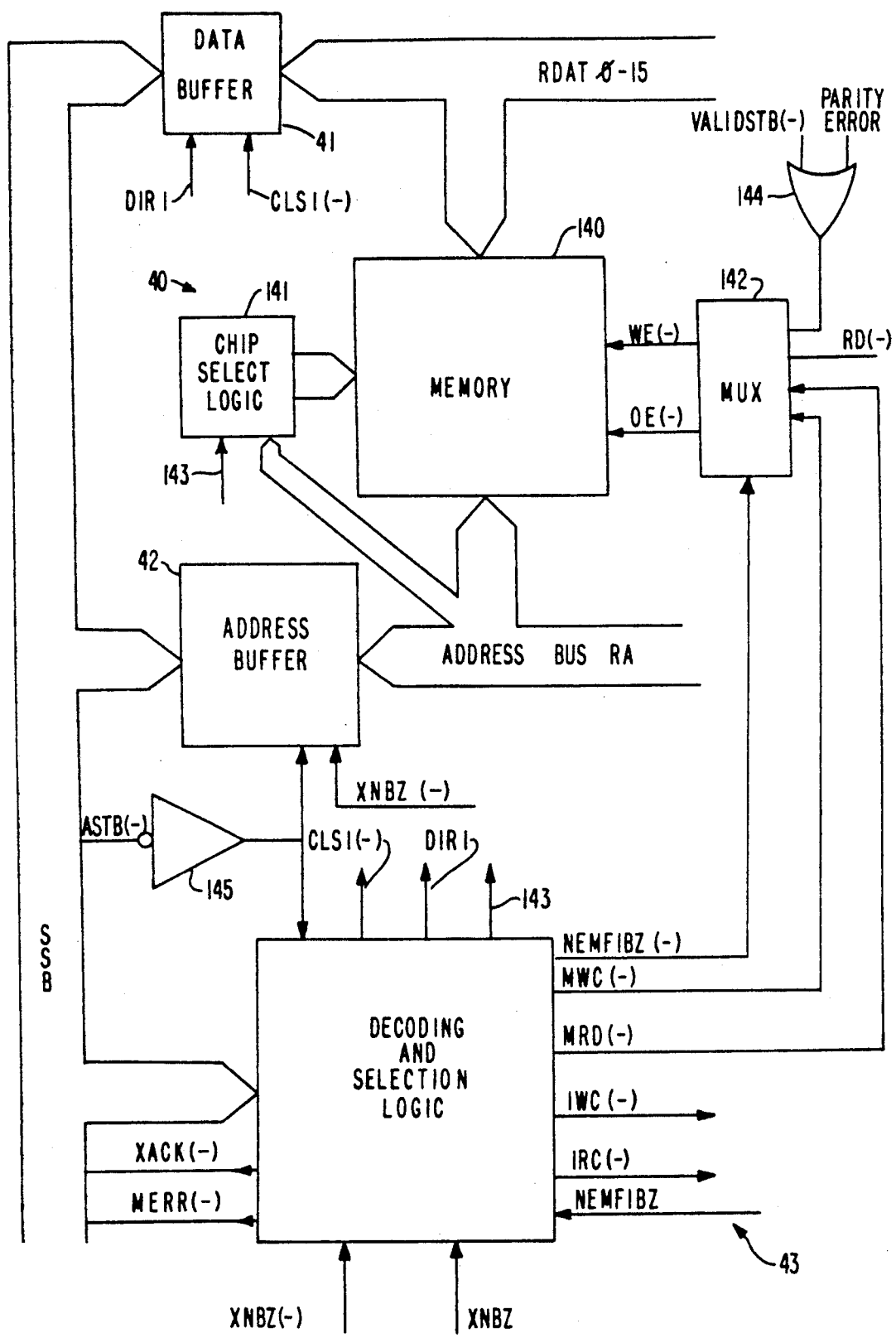
FIGS. 3 to 20 are more detailed block diagrams of parts of the interface of FIG. 2, FIGS. 21 to 28 are circuit diagrams of parts of the interface of FIG. 2, and FIGS. 20 and 30 are flow diagrams of the operation of two parts of the interface of FIG. 2.

FIG. 3 shows in more detail the memory 40 and inputs and outputs to the data buffer 41, address buffer 42 and decoder and logic unit 43. The memory 40 includes a memory matrix 140, chip selection logic 141, and a read and write control multiplexer 142. The chip selection logic 141 is driven by three lines of the internal address bus RA and a control signal 143 from the decoder and logic unit 43. The control signal 143 is active when either a memory function is signalled by the sub-system bus SSB or the signal NEMFIBZ is active indicating that cross talk data is being broadcast on the major function bus MFB. The multiplexer 142 provides paths from one of its two pairs of input pins to its two output pins in accordance with the state of a low active signal NEMFIBZ(—) produced from NEMFIBZ by the decoder and logic unit 43. IF the signal NEMFIBZ(—) is active, a signal VALIDSTB(—) and the signal RD(—) control the outputs WE(—) and OE(—) of the multiplexer 142 respectively. The signal VALIDSTB(—) is blocked by an OR gate 144 if there is a parity error. If NEFMIBZ(—) is not active, the multiplexer output signals WR and RD are controlled respectively by write and read control signals MWC(—) and MRD(—) developed by the decoder and logic unit 43 in response to signals on the sub-system bus. Since NEMFIBZ(—) is active whenever NEMFIBZ(—) is active, the sub-system bus cannot read or write into the memory matrix 140 while any slave state machine of the system is active. Also, the address buffer 42 and part of the decoder and logic unit 43 receive the signal XNBZ(—) which enables the buffer 42 and the respective part of unit 43 only when the master state machine of the system is not active.

The direction of data flow and the enabling of the data buffer 41 are controlled respectively by the signals DIR1 and CLS1(—) developed by the unit 43, the signal DIR1 being representative of the state of the read control signal MRD(—), and the signal CLS1(—) being set high by the active state of the signal NEMFIBZ.

An address strobe signal ASTB(—) is supplied by the sub-system bus SSB to an inverter 145 coupled to the address buffer 42 and the unit 43.

Whenever the unit 43 is enabled to decode a control signal from the sub-system bus SSB, it develops an acknowledgement signal XACK(—) which returns to the bus SSB. If such a control signal is decoded while the master control talk signal XNBZ is low, indicating that the master state machine is active, the unit 43 develops a signal MERR(—) indicating to the bus SSB that access to the memory 40 of this MFI is not possible at present.

Figure 4:
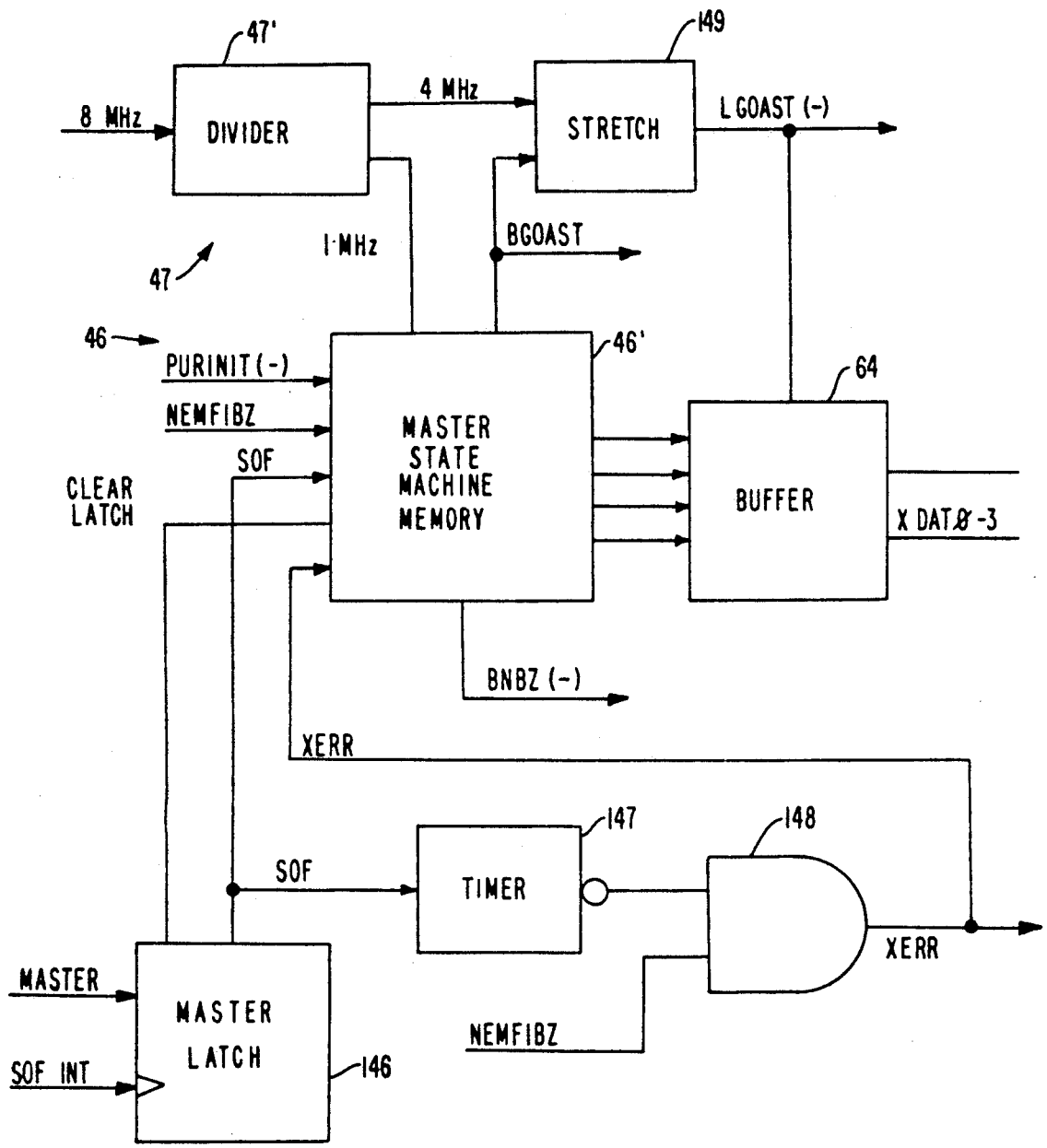

FIG. 4 shows the master state machine 46 in more detail.

The master state machine 46 includes a master state machine memory 46' and a master latch 146. The start of frame interrupt signal SOF INT acts as a clock signal to latch a signal MASTER in the latch 146. The signal MASTER is supplied by the switch SW1 and is active when the master state machine of this MF1 is to be enabled. The latch 146 supplied a signal SOF at the start of a frame to the memory 46' and a timer 147 which then runs for 5 milliseconds during which it presents a low output signal to one input of an AND gate 148 which receives NEMFIBZ at its other input. Consequently if NEMFIBZ is still active when the output of the timer 147 goes high, the gate 148 produces the error signal XERR which is supplied to an input of the memory 46' and to the logic unit 60 of FIG. 2.

The divider and logic unit 47 comprises a divider circuit 47 which divides the 8 megahertz clock signal from the clock 49 down to 1 megahertz and to 4 megahertz to clock the output signal BGOAST from the memory 46' into a stretching circuit 149 which lengthens BGOAST into a low active signal LGOAST(—) for enabling the buffer 64.

Figure 21:
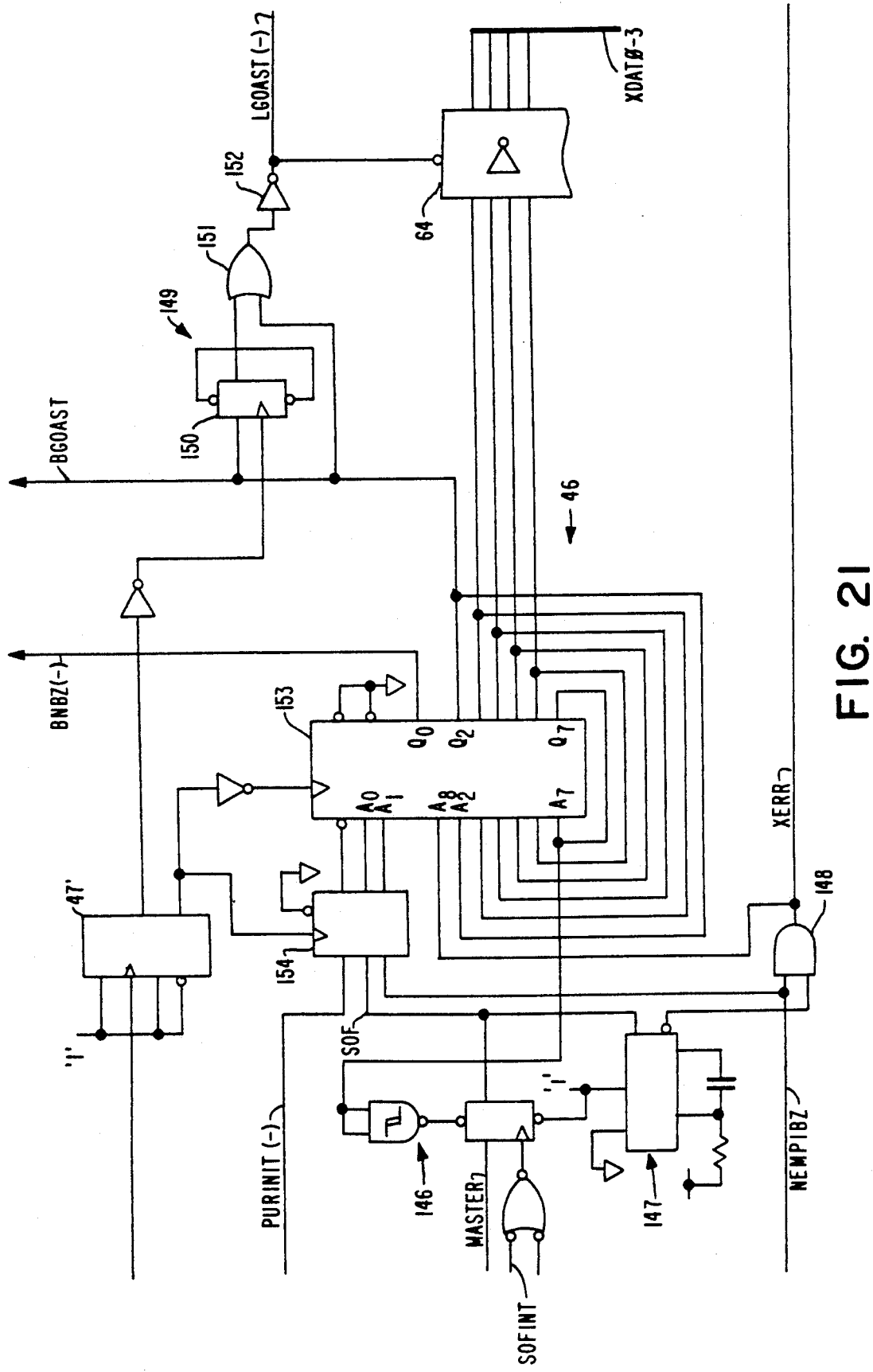

FIG. 21 shows an implementation of FIG. 4 in which the stretching circuit 149 consists of a D flip flop 150 supplying one input of an OR gate 151 which drives an inverter 152, the other input of the OR gate 151 and the D input of the flip flop 150 receiving the signal BGOAST. A type 64LS74 circuit can be used to provide 125 nanoseconds delay. The master state machine memory 46' in FIG. 21 consists of a registered PROM 153 and a latch 154 clocked by opposite phases of the 1 megahertz output of the divider 47'. The registered PROM 153 generates programmed sets of output levels at eight output pine $Q_0$ to $Q_7$ in dependence upon sets of input levels supplied to nine input pins $A_0$ to $A_8$, but only in response to a clock signal, so that its outputs change only at a clock signal. Output $Q_0$ provides BNBZ(—), output $Q_2$ provides BGOAST, and outputs $Q_3$ to $Q_7$ provide the major function addresses which are placed on lines 0 to 3 of XDAT by the buffer 64. The output pins $Q_2$ to $Q_7$ are connected respectively to the input pins $A_2$ to $A_7$ as indicated in FIG. 21. The latch 154 is connected to latch a clear signal PURINIT(—), the start of frame signal SOF, and the slave busy signal NEMFIBZ. The registered PROM in this example is the type AM27S26.

The master latch 147 can be formed by a D flip flop 155 cleared by the $Q_7$ output of the PROM 153, clocked by SOF INT, and having MASTER as the D input. The timer 147 may employ a type 74LS123 circuit, connected to a capacitor of 0.1 microfarads in series with a resistor of 110 kilohms.

Figure 29A:
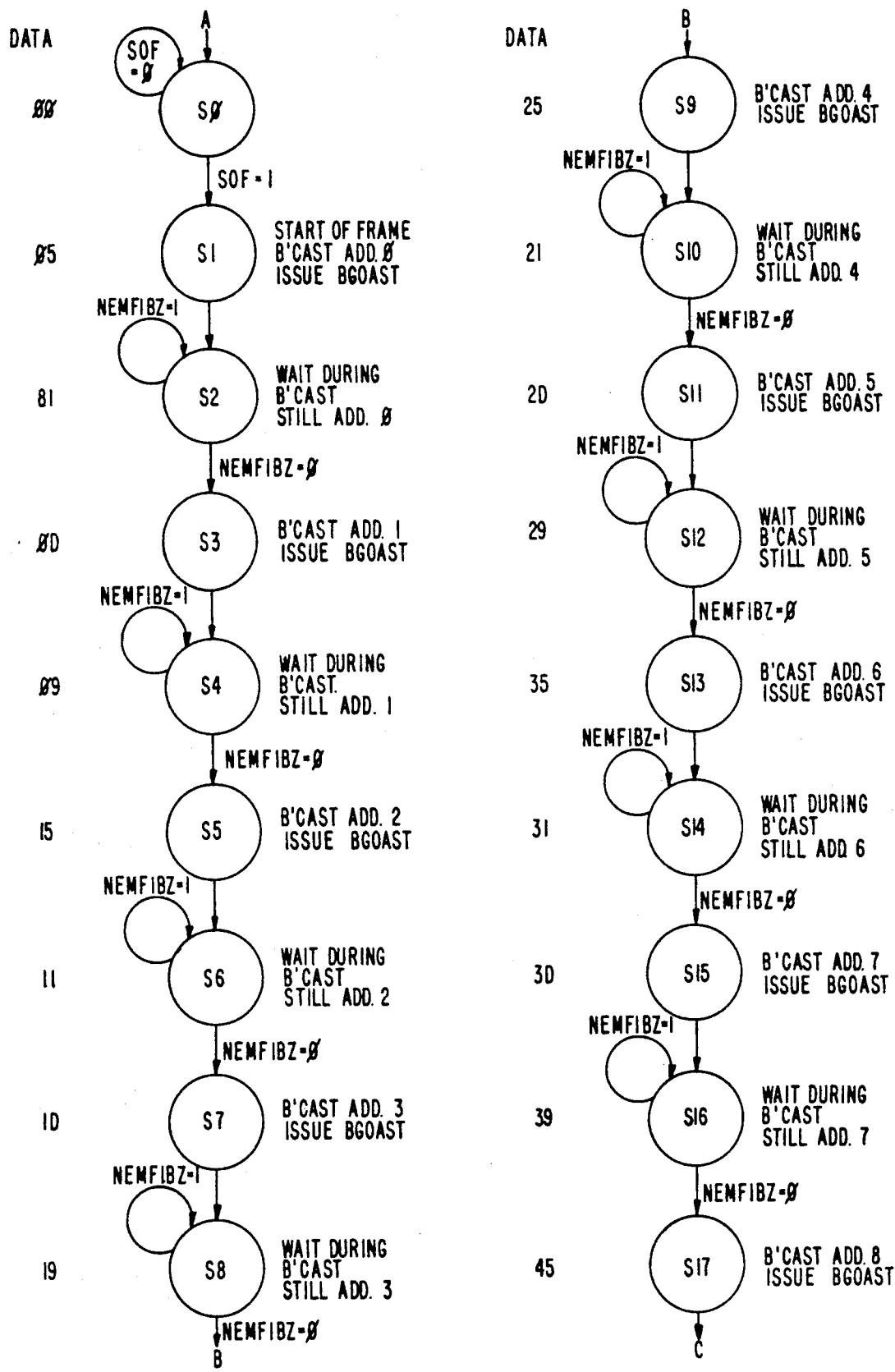

In operation the master state machine PROM 153 broadcasts sixteen addresses to the buffer driver 64 in the course cycling through 32 states. The address broadcasts occur during odd-numbered states. The state diagram for the master state machine is shown in FIGS. 29a and b.

The latch 154 clocks the following control signals into the PROM 153:
1. CLEAR
2. SOF (start of frame) onto address input $A\phi$ 3. NEMFIBZ (any major function busy) onto address input A1.

The master state machine remains in its reset/idle state with the Q0-Q7 outputs of the PROM 153 at zero if inputs A0 and A1 are low. These inputs, SOF and NEMFIBZ respectively, determine the next state (wait or otherwise) assumed by the state machine at its next clock pulse.

The state machine starts it cycle i.e. enters state 1 from its idle/reset state only when its SOF input is high and its NEMFIBZ input is low.

In state 1 and all subsequent states the state machine issues BNBZ high to indicate that a broadcast is taking place. During state 1, BGOAST is issued to partially enable all slave state machines, and major function address 0 is broadcast to complete the enabling of the slave state machine for the MFI at address 0. This slave state machine then begins its own cycle, asserting TMFIBZ (this major function busy) for the whole slave cycle. TMFIBZ is returned as NEMFIBZ (any major function busy) high to the master state machine latch 154.

At the next 1 MHz clock pulse the master state machine enters state 2 and SOF is cleared. If the MFI at address 0 is still busy with its own slave cycle, NEMFIBZ is still high at input A1 in the master state machine which therefore waits at state 2 until NEMFIBZ goes low. While in state 2, the master state machine does not drive the major function bus but does keep BNBZ active.

At the next 1 MHz clock pulse that occurs after NEMFIBZ goes low, the master state machine enters state 3 issuing inactive BNBZ active, BGOAST, and broadcasting an incremented major function address (address 1).

The master state machine cycle continues in this way up to state 32 when SOF is cleared and the master state machine returns to the reset/idle state.

When major function addresses are output for a non-existent major functions, NEMFIBZ remains low and the master state continues to its next state at the next clock pulse.

Figure 29B:
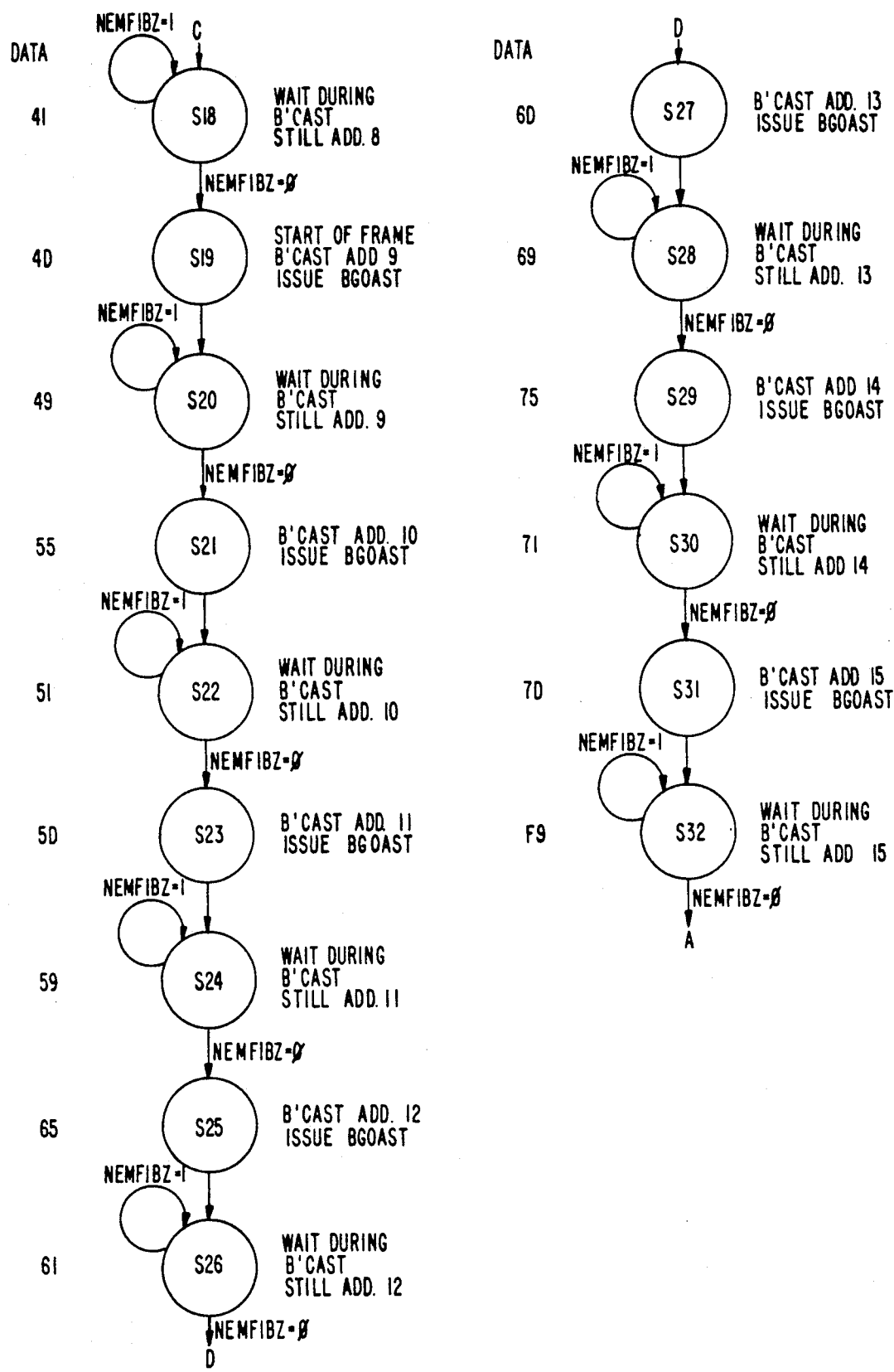

In FIG. 29, the output data values from the PROM 153 at each of the state S0 to S32 are indicated by a column of hexadecimal values headed DATA.

Figure 5:
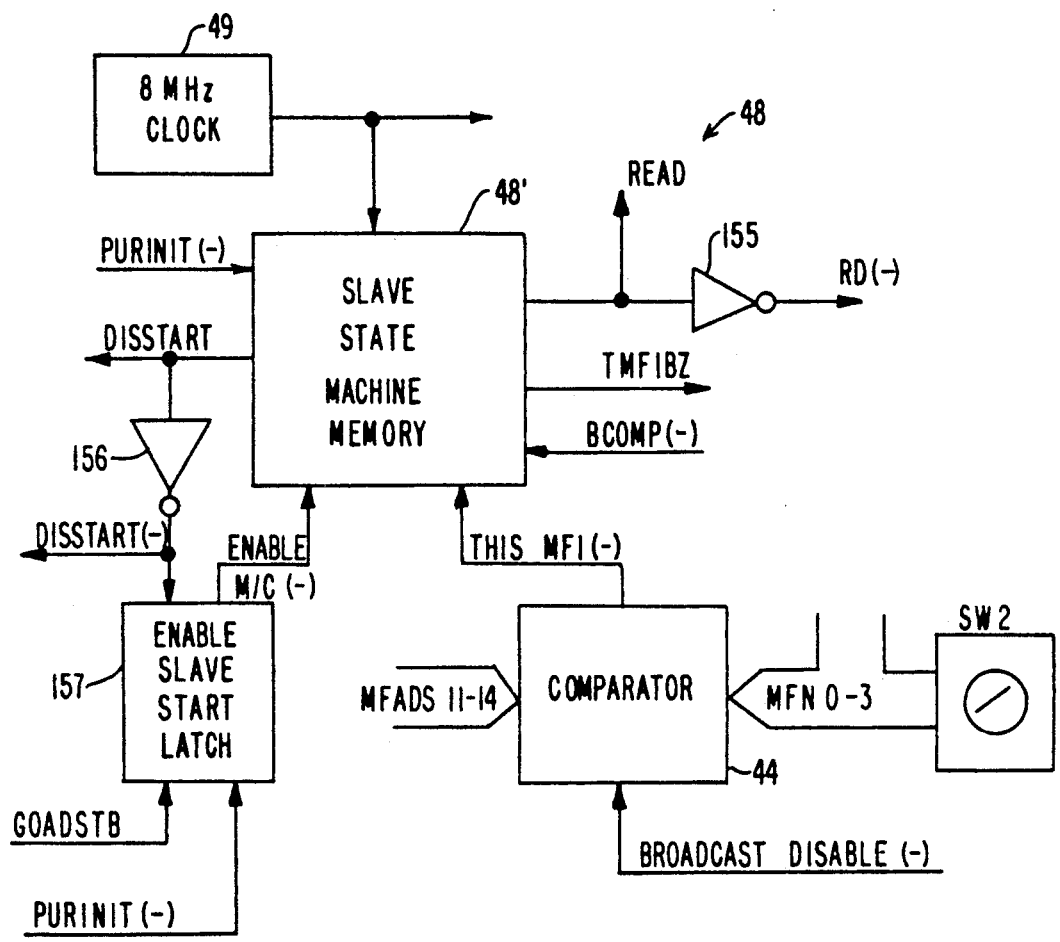

The slave state machine 48 is similar to the master state machine and is shown in more detail in FIG. 5. The slave state machine 48 includes a slave state machine memory 48' which, when running through its cycle of states, is clocked by the 8 megahertz clock 49. Two inverters 155 and 156 produce the signals RD(−) and DISSTART(−) from the control signals READ and DISSTART generated by the memory 48'. An enabling latch 157 supplies an enabling signal ENABLE M/C to the memory 48' in response to a strobe signal GOADSTB corresponding to the signal BGOAST issued by the master state machine 46, but the slave state machine 48 only begins its cycle of states if a signal THIS MFI(−) is active from the major function address comparator 44.

Figure 22:
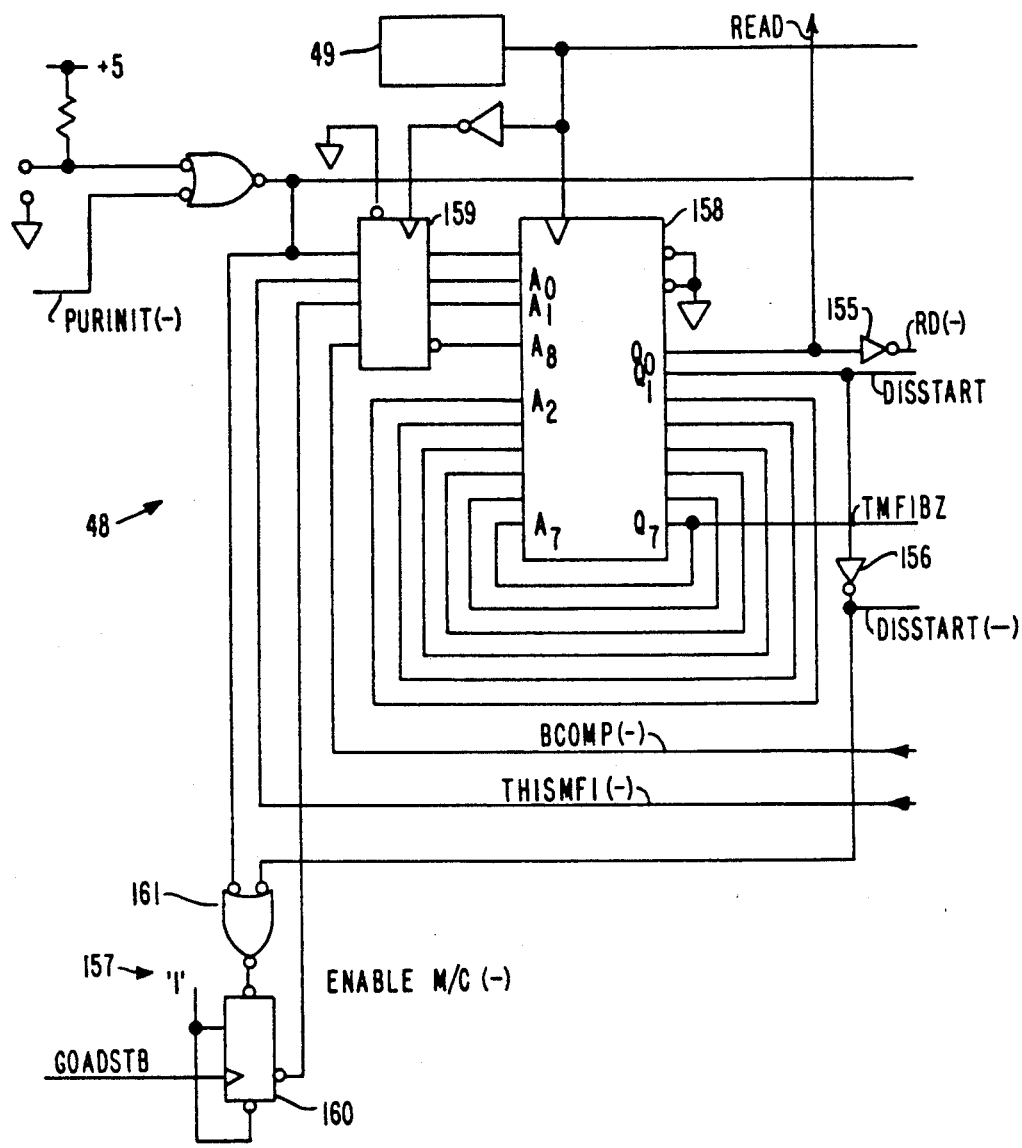

FIG. 22 shows a circuit for implementing the slave state machine in which the memory 48' comprises a registered PROM 158 and a latch 159. The latch 159 and the corresponding latch 154 of FIG. 21 may each be a type 74S379 circuit. The registered PROM 158 may again be an AM27S25 circuit. The latch 159 is clocked by the opposite phase of the 8 megahertz clock signal from the phase clocking the PROM 158.

The enabling latch 157 may be a D flip flop 160 with a clear signal applied through a negative logic OR gate 161. The strobe signal GOADSTB clocks the flip flop 160, and the slave output control signal DISSTART(−) normally clears the flip flop 60.

THe latch 159 receives the signals BCOMP(−), THIS MFI(−) and ENABLE M/C(−) (from the latch 157) as inputs, which it applies respectively to address input pins $A_8$, $A_0$ and $A_1$ of the PROM 158.

Figure 30:
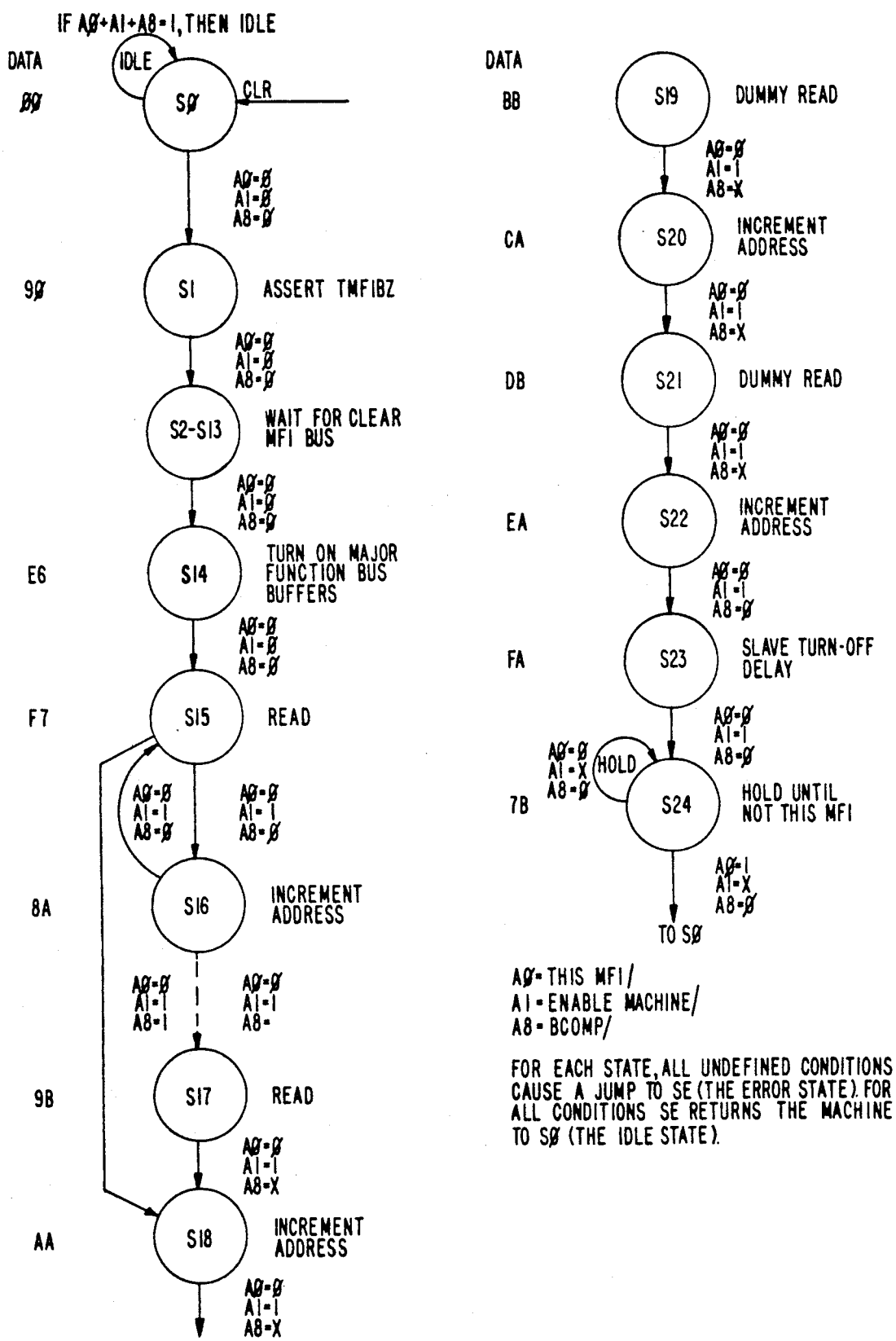

THe slave state machine cycle for a particular MFI operates within a respective even-numbered state in the master state machine cycle. The state diagram for the slave state machine is shown in FIG. 30.

The associated master state machine is in most cases in another MFI and runs asynchronously at a different frequency (1 MHz). To cater for these differences 13 wait states are includes in the slave state machine cycle. This ensures that the major function bus MFB is clear before the slave state machine initiates cross talk broadcastings.

The PROM 158 is addressed on inputs A2–A7 by the corresponding wrapped around outputs Q2–Q7. The Q7 output asserts TMFIBZ (this major function interface busy).

Other outputs from the PROM 158 are the READ output from Q0, and the DISSTART output from Q1.

The slave state machine remains in its reset/idle state with Q7 outputs at zero if any of the inputs A0, A1 or A8 are high. These inputs determine the state assumed by the machine at its next clock pulse. The slave state machine starts its cycle i.e. enters state 1 only when all three inputs are low. At state 1 the slave state machine asserts TMFIBZ high on output Q7 and the moves on to state 2 to the next clock pulse. This signal TMFIBZ remains high for the next twenty-two states.

The machine steps through states 2–13 to allow the function bus.

At state 14, DISSTART is issued from Q1 to prepare conditions for the first of a number (defined in the broad cast limit register) of read operations.

At state 15, the contents of the allocated area in the cross talk memory 40 are read at the address present on the internal address bus RA.

At sate 16, the address on the counters 52 and 53 is incremented by READ going low on output Q0. States 15 and 16 then continue in a loop until the broadcast limit comparator 58 sets the input $A_8$ high on the PROM 158.

States 19 to 22 comprise dummy read operations with consequent dummy address increments. Theses are necessary to ensure that data broadcast over the major function bus is not lost due to pipelining.

At state 23, DISSTART goes low at the Q1 output and thereby disables the latch 157.

At state 24, the PROM 158 sets its output Q7 (TMFIBZ) low. This signal is sent to the master state machine as NEMFIBZ (any other function not busy) allowing the master state machine to broadcast the next major function address to all MFIs. The new major function address is received by this card and latched by the latch 51 onto 'A' inputs of the address comparator 44 which has the address for this MFI (from the address selector switch SW2) present on 'B' inputs. As the two addresses are not equal, the signal THIS MFI(−) goes high causing input A0 on the salve state machine to go high. In response, the slave state machine returns to sate 0 (the idle condition).

The values of the outputs from the PROM 158 at each state are shown in a column of hexadecimal values headed DATA in FIG. 30, which illustrates the slave cycle.

Each control and data bit signal on the major function bus MFB is a differential signal requiring a pair of lines. Consequently each such signal is placed on the major function bus by a differential output buffer and is received from the bus through a differential input buffer. Gated buffers are used, some being gated permanently open to enable transmission or reception under all working conditions.

Figure 6:
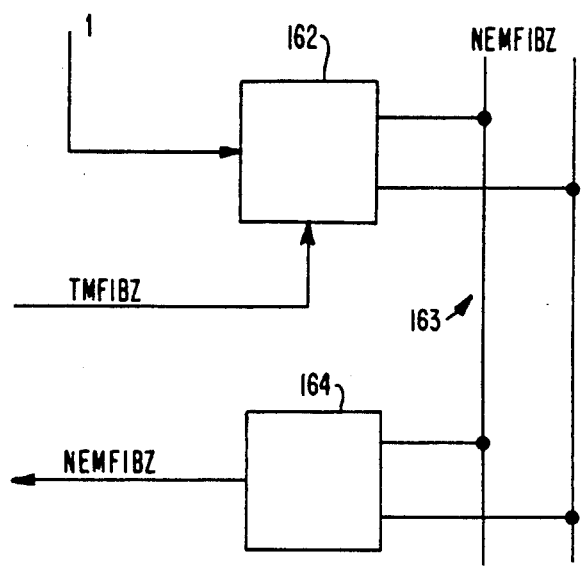

FIG. 6 shows a differential output buffer 162 for the high active signal TMFIBZ connected through a pair of lines 163 of the major function bus to a permanently open differential input buffer 164 which produces the high active signal NEMFIBZ whenever there is a high active signal TMFIBZ at any output buffer 162 connected to the lines 163. The signal TMFIBZ is used to gate a permanently high input, indicated by one input value 1 in FIG. 6, through the buffer 162. The gate terminal of the buffer 164 is not shown but is permanently high so that the buffer 164 is permanently open. With this arrangement, any slave machine generating TMFIBZ causes the signal NEMIFBZ to produced in all the major function interfaces.

Figure 7:
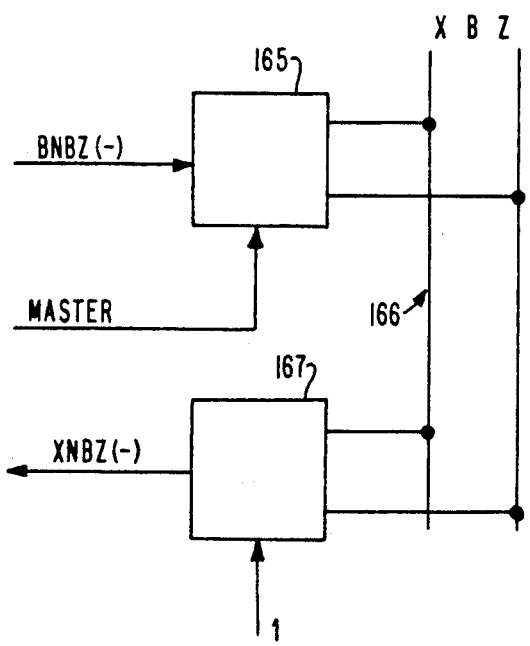

FIG. 7 shows a differential output buffer 165 receiving the master state machine generated signal BNBZ(−), which is active whenever the master state machine is in its idle state, as input signal, and gated by the signal MASTER which is high only in the MFI in which the master state machine is activated by the switch SW1. The signal BNBZ(−) produces the signal XBZ on a respective pair o lines 166 of the MFB. A permanently open differential input buffer 167 produces the signal XNBZ(−) in response to XBZ. Since the signal MASTER is active throughout operation of system, the signal XNBZ(−) is produced in all major function interfaces and is a replica of BNBZ(−)

Figure 8:
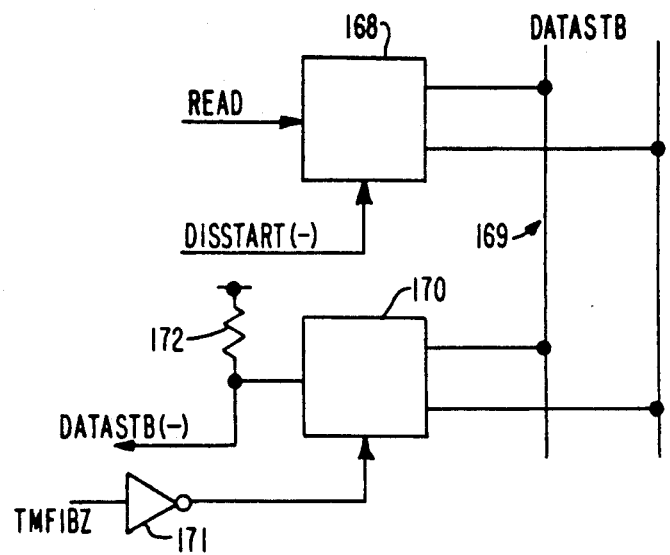

FIG. 8 shows the signal READ, produced by the slave state machine, applied as an input to a differential output buffer 168 which is gated by the signal DISSTART(−), also produced by the slave state machine, and is connected through a pair of lines 169 of the MFB to the inputs of a differential input buffer 170 gated by an inverted version of the signal TMFIBZ. The output of the input buffer 170 is held high through a resistor 172. Consequently, in a major function interface MFI in which the slave state machine is active, and therefore producing the signal TMFIBZ, the signal DATASTB(−), produced by the buffer 170, is high, i.e. not active.

In all other MFI2, DATASTB(−) is high when READ is high in the broadcasting MFI, and low when READ is low in the broadcasting MFI.

Figure 9:
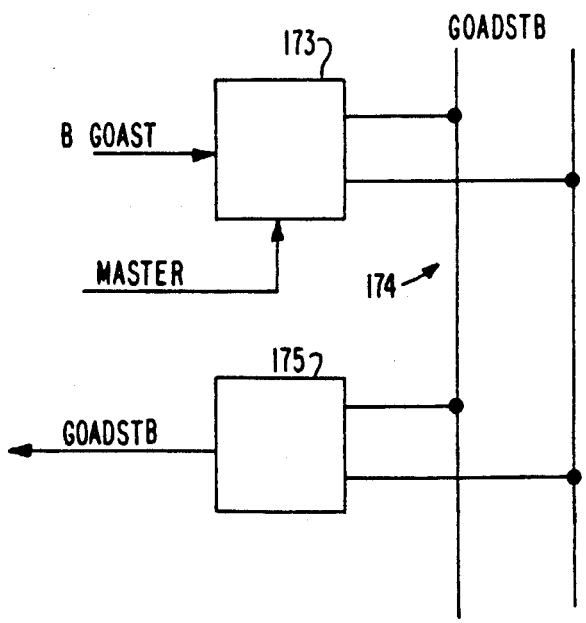

FIG. 9 shows the signal BGOAST, produced by the master state machine, applied as an input to a differential buffer 173 which is connected through a pair of lines 174 of the major function bus to the inputs of a differential input buffer 175 which is permanently open. Since the signal MASTER is active throughout operation of the system, the signal GOADSTB in all the major function interfaces is a replica of the signal BGOAST.

Figure 10:
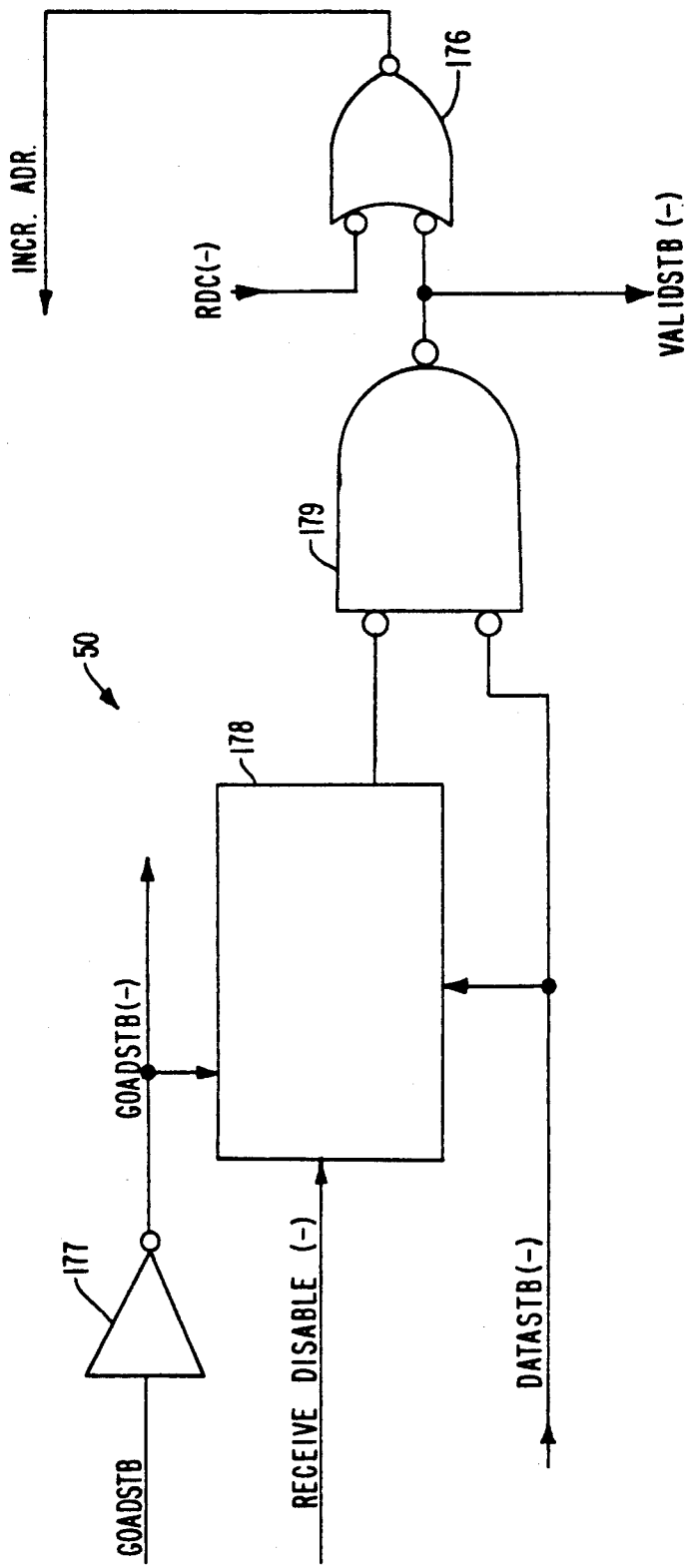

FIG. 10 shows the validating circuit 50 which provides a validated version of the signal DATASTB(−), labelled VALIDSTB(−), and, in combination with a negative logic OR gate 176 provides the clock signal for the address generator counters 52 and 53, this clock signal, INCR.ADR., being the signal RD(−) in an MFI in which the slave state machine is active, i.e. in the broadcasting MFI, and being the validated strobe signal VALIDSTB(−) in all other MFIs. The validated strobe signal VALIDSTB(−) is a replica of the signal DATASTB(−) except for the first two occurrences of active DATASTB(−) in each broadcast of cross talk data. The replica signal GOADSTB, which is generated at each odd number state of the master state machine cycle, is inverted by an inverter 177 and the inverted signal is supplied as a reset to a counter 178 which, unless disabled by a test signal RECEIVE DISABLE (−), produces a high output during the next two occurrences of an active DATASTB(−) Signal which is supplied as a clock signal to the counter 178. The output of the counter 178 and the signal DATASTB(−) are supplied as inputs to a two input negative logic AND gate 179 supplying one input of the negative logic OR gate 176. The output from the negative logic AND gate 179 is the validated strobe signal VALIDSTB(−).

Figure 11:
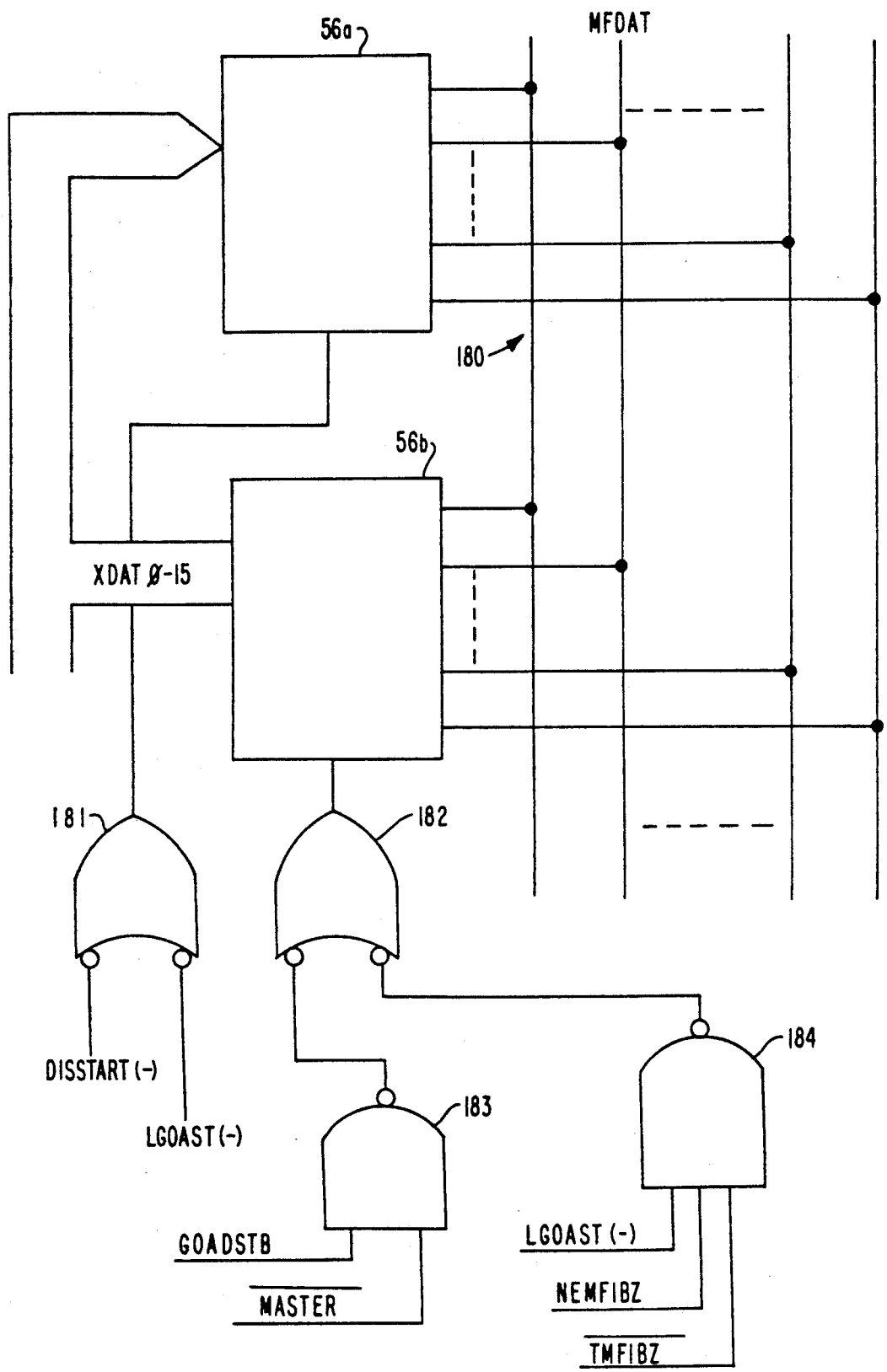

The transmission of data and major function addresses onto the major function bus MFB and their reception from that bus are controlled in each major function interface MFI by the differential buffer set 56 which consists of a transmitter set 56a of sixteen differential output buffers, and a receiver set 56b of sixteen differential input buffers, connected to sixteen pairs of major function data lines 180 represented schematically in FIG. 11.

Each buffer in the transmitter set 56a is gated by output of an OR gate 181 with inverted inputs, the input signal supplied being DISSTART(−) and LGOAST(−). Consequently data can be transmitted from the crosstalk data bus XDAT to the data lines 180 of the major function bus if either DISSTART(−) or LGOAST(−) is active, i.e. if the slave state machine of this MFI is active, or if this MFI is the master and the master state machine is generating a major function address, the duration of LGOAST(−) being chosen to enable the buffer set 56a for the broadcasting of a major function address.

Each buffer in the receiver set 56b is gated by the output of another OR gate 182 with inverted inputs. The inputs to this OR gate are supplied by a two input AND gate 183 with inverted output and a three input AND gate 184 with inverted output. The inputs to the AND gate 183 are the replica signal GOADSTB and the inversion of MASTER. The inversion of MASTER is a high active signal which is active in all major function interfaces except that in which the master state machine is activated, referred to herein as the master MFI, the other major function interfaces being referred to as slave MFIs. In a slave MFI, the gate 183 is open, i.e. enabled by MASTER, and the receiver set 56b of buffers is enabled whenever GOADSTB is active, so that major function addresses can be received from the MFB and placed on the cross talk data bus XDAT.

In the master MFI, the gate 183 is enabled by MASTER, and the gate 184 produces a low output, and therefore enables the receiver set 56b, only when it is true both that LGOAST(−) is not active and one of the slave state machines which is not that of the master MFI is active. THe latter condition is indicated by NEMFIBZ active and TMFIBZ, which is the inversion of TMFIBZ, is active. In a slave MFI, LGOAST(−) is always not active, i.e. is high and the gates 182 and 184 enable the receiver set 56b whenever a slave MFI, other than one to which these gates 182 and 184 belong, is active. Thus the receiver set 56b is enabled to receive major function addresses, by the gate 183, and cross talk memory data, by the gate 184, from the major function bus. The major function addresses generated by the master MFI and not received from the major function bus at the master MFI, since its gate 183 is disabled by MASTER. Instead, since the first four lines, XDAT 0 to 3, of the cross talk data bus XDAT are connected directly to both the buffer 64 for the master state machine (FI. 4) and the latch 51 (FIG. 2), the major function addresses are latched directly into the latch 51 from the buffer 64.

Figure 12:
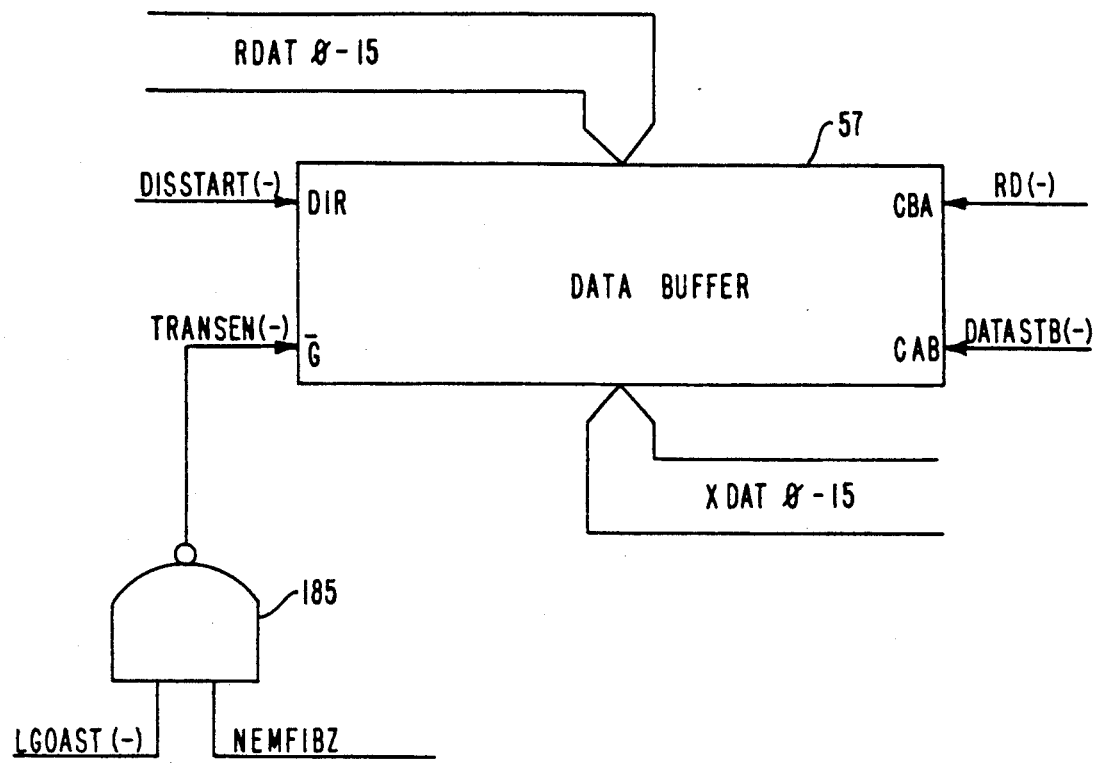

The cross talk data bus XDAT is coupled to the internal data bus RDAT by the data buffer 57 which, as shown in FIG. 1, is controlled by four control signals, TRANSEN(−), DISSTART(−), RD(−) and DATASTB(−). The signal TRANSEN(−) is a low active enabling signal produced by a two input negative output AND gate 185. The two inputs to the gate 185 are the low active signal LGOAST(−) which is active only in the master MFI. and the signal NEMFIBZ which is active in all major function interfaces whenever any one of them has an active slave state machine. Consequently the buffer 57 in all MFIs is disable when no MFI is broadcasting cross talk data, and the buffer 57 in the master MFI is disabled whenever a major function address is placed on the four lines XDAT 0 to 3 of the cross talk data bus. IF there is no major function address being placed on XDAT 0 to 3, LGOAST(−) is high and the gate 185 is enabled for the signal NEMFIBZ, so that the data buffer 57 is enabled by TRANSEN(−) for the reception and transmission of cross talk memory data. THe direction of transfer of data through the buffer 57 is determined by the status of the signal DISSTART(−), which is low with a transmitting slave state machine and high in a receiving MFI. The buffer 57 has two clock inputs, one being the signal RD(−), which is active only with a transmitting slave state machine. In a receiving MFI, the signal DATASTB(−), which is a low active replica of READ in at the transmitting slave state machine, is the clock input. The transmitting direction in FIG. 12 is designated BA, and the receiving direction AB. Thus in an MFI in which the slave state machine is active, DISSTART(−) is low, RD(−) is the clock signal and cross talk memory data is transferred from the internal data bus RDAT to the cross talk data bus XDAT, whereas in an MFI in which the slave state machine is not active, DISSTART(−) is high and data is transferred from the cross talk data bus XDAT to the internal data bus RDAT in synchronism with the signal DATASTB(−).

Figure 14:
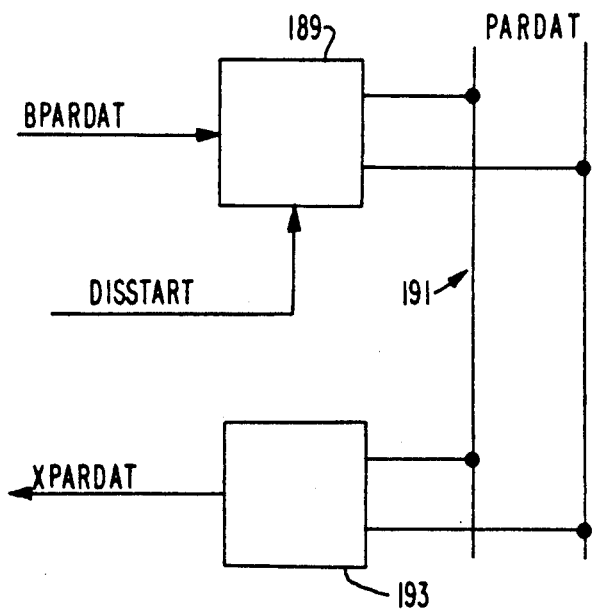
Figure 13A:
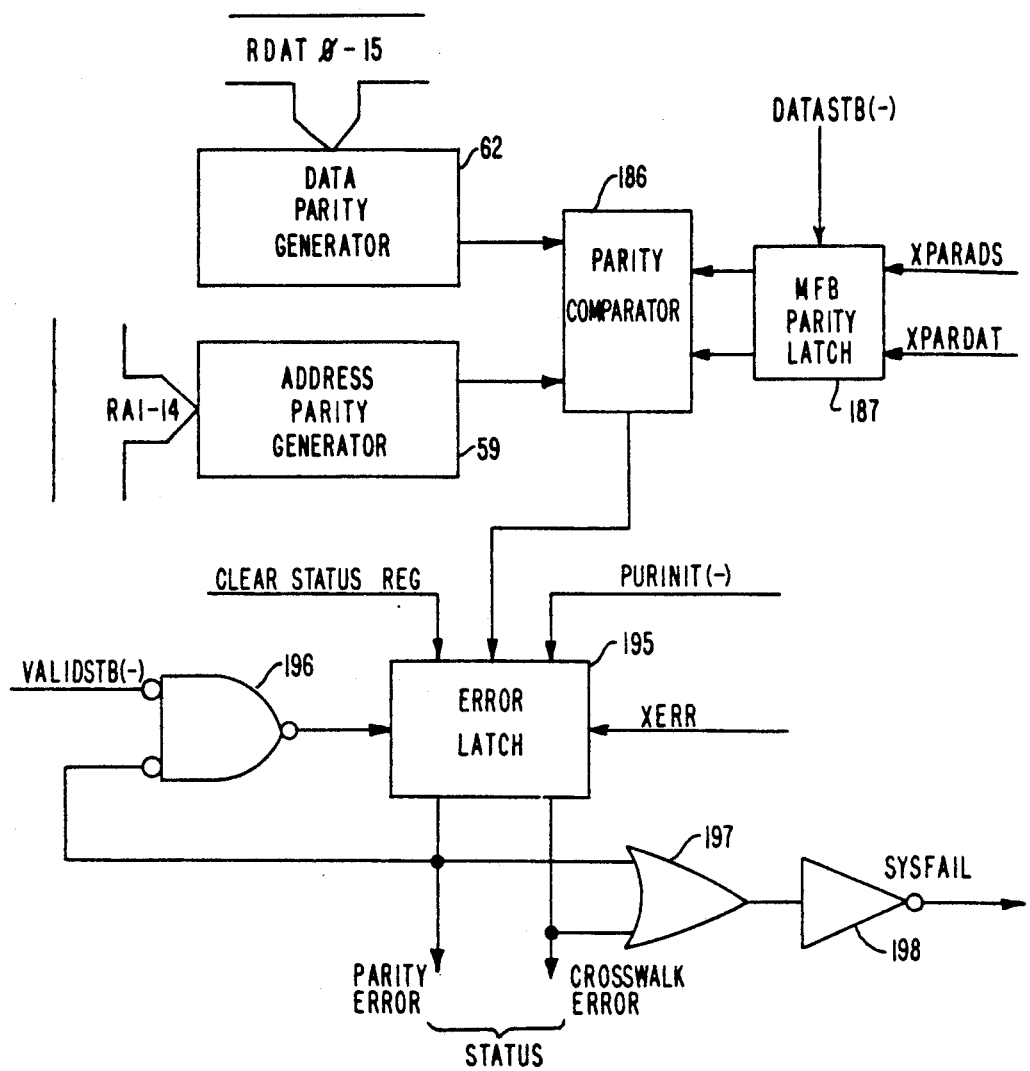
Figure 13B:
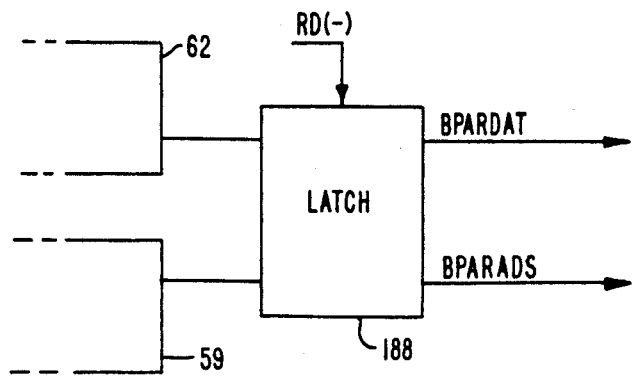
Figure 15:
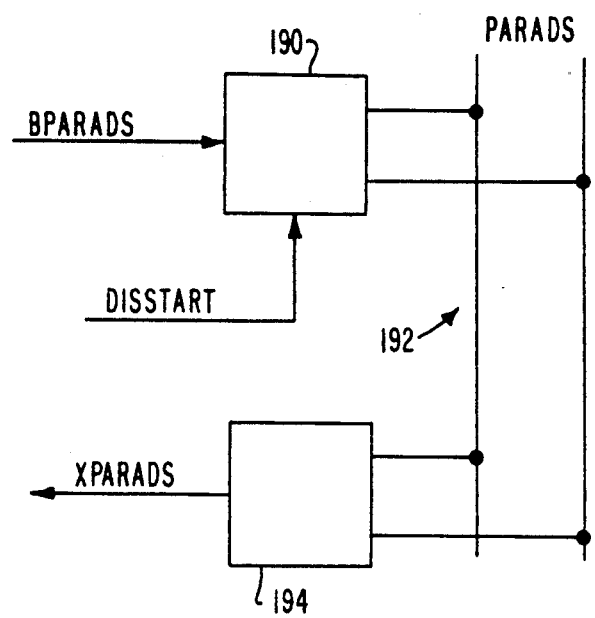
Figure 17:
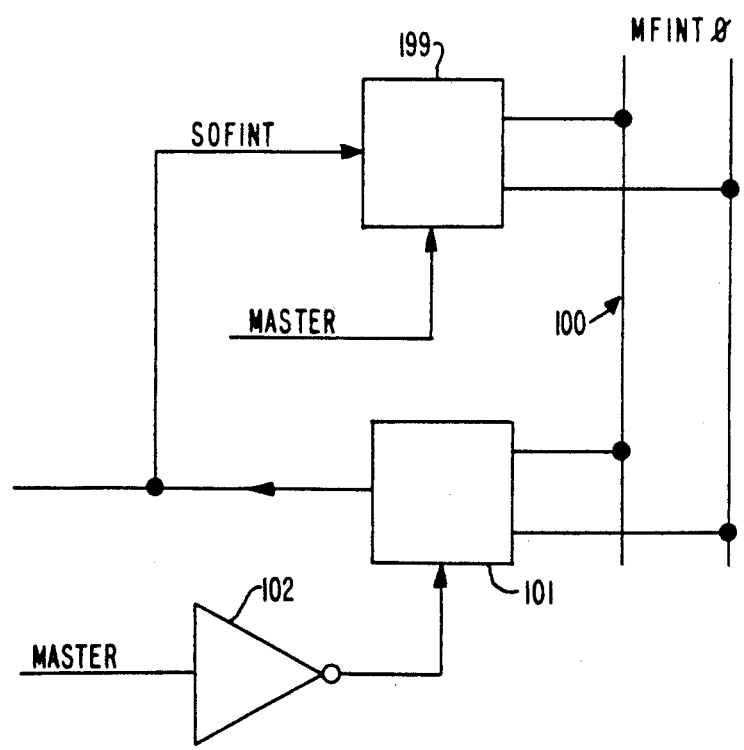

FIGS. 13a and 13b show in more detail those parts of the logic unit 60 of FIG. 2 which are coupled to the data parity generator 62 and the address parity generator 59. The generators 59 and 62 supply their outputs to a parity comparator 186 which receives two further inputs from a major function bus parity latch 187. The outputs of the generator 62 and 59 are also supplied to a latch 188 clocked by the low active signal RD(−), and therefore only enable in an MFI in which the slave state machine is active. The latch 188 supplies two signals BPARDAT and BPARADS, respectively representing the data parity generator output and the address parity generator output, to respective differential output buffers 189 and 190 shown FIGS. 14 and 15. The output of the buffer 189 is enabled by the signal DISSTART, which is active only when the slave state machine of that MFI is active, and applies a corresponding data parity signal PARDAT to a pair of lines 191 of the major function bus. Similarly, the buffer 190 applies a corresponding address parity signal PARADS to a pair of lines 192 of the major function bus, when DISSTART is active. Permanently enabled differential input buffers 193 and 194 in each MFI produce a cross talk data parity signal XPARDAT and a cross talk address parity signal XPARADS corresponding to BPARDAT and BPARADS. In a receiving MFI, the signals XPARDAT and XPARADS are clocked into the latch 187 (FIG. 13a) by the signal DATASTB(−), so that the parity comparator 186 compares the received data parity signal XPARDAT with the locally generated parity signal from the data parity generator 62, and compares the received address parity signal XPARDAT with the locally generated parity signal from the address parity generator 59. The data on the internal data bus RDAT at this time is the cross talk data received from the transmitting MFI, so that if the data parity signals do not match, an error has occurred in the transmission of that data. If a parity error has occurred, the output of the comparator 186 causes a parity error signal to appear at one output of an error latch 195 which is a high active signal and is locked on y a negative logic AND gate 196 enabled by the signal VALIDSTB(−). The address on the internal address bus RA at this time is the address generated locally by the counter 52 and the buffer/driver 55. If the parity of the locally generated address does not match the received address parity signal XPARADS, the comparator 186 produces an output signal causing the parity error signal to appear from the error latch 195, unless already locked on. The parity error signal is locked on for whichever type of parity error is sensed first. The parity error signal is also supplied to block the OR gate 144 (FIG. 3) and thereby prevent the signal VALIDSTB(−) being supplied as a write control signal to the multiplexer 142.

The error latch 195 also sets a signal CROSS TALK ERROR active on receiving the time out error signal XERR from the master state machine 46 which can occur if this MFI contains the activated master state machine.

The error latch 195 can be cleared by either of two signals, CLEAR STATUS REG and PURINIT(−). The error signals from the latch 195 are supplied to an OR gate 197 driving an inverter 198 to produce an interrupt signal SYSFAIL which is supplied to a line of the sub-system bus SSB of the major function to inform an interrupt handling microprocessor of the major function that an error has occurred. The clearing signal CLEAR STATUS REG is decoded from an address which can be transmitted to the internal address bus RA from the sub system bus SSB.

Figure 16:
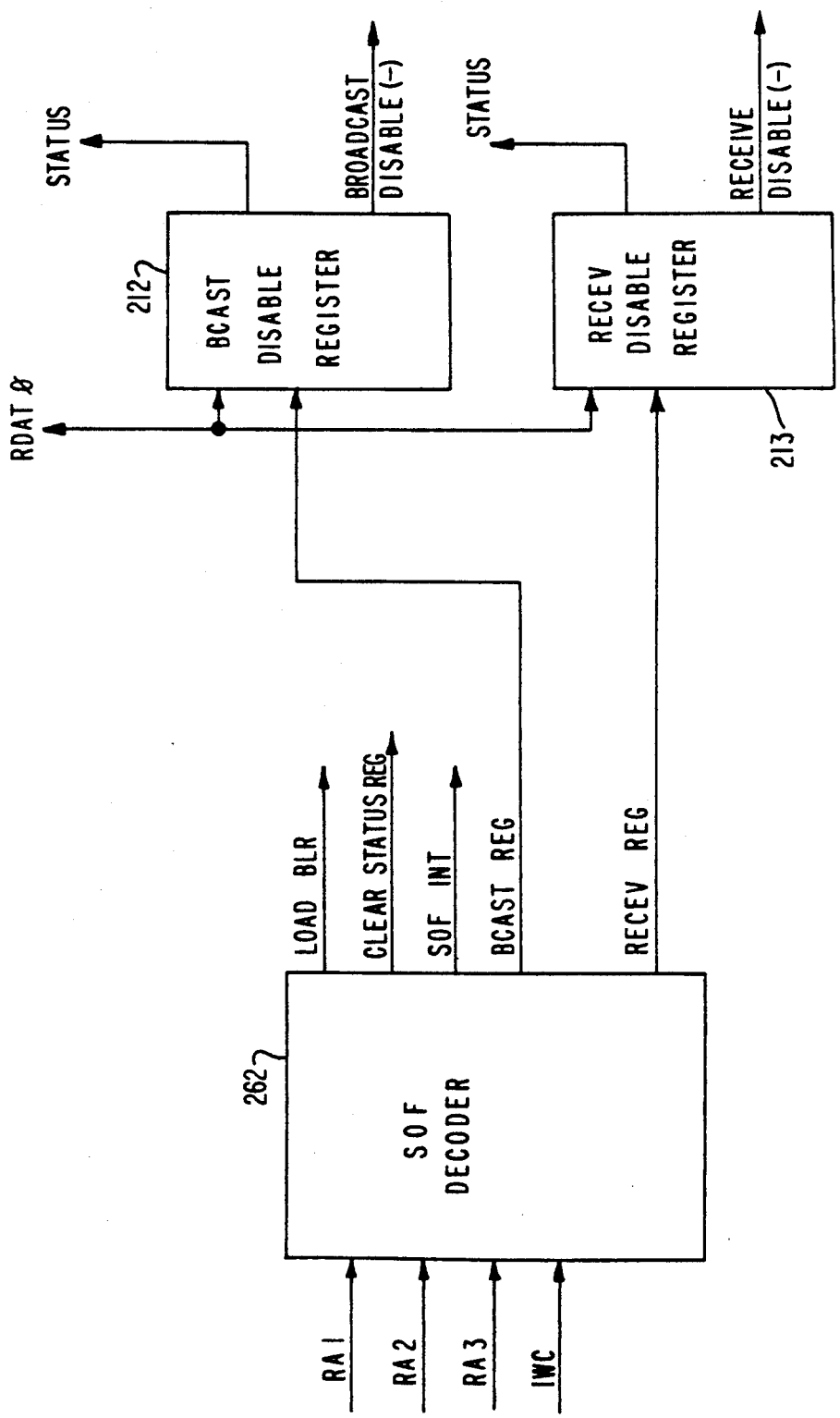

FIG. 16 shows the decoder 262 which receives the three internal address bus lines RA1, RA2 and RA3, and the input write control signal IWC(−) from the decoder and logic unit 43 (FIG. 3). According to the status of these four inputs, the decoder 263 develops ones of five output signals, LOAD BLR, CLEAR STATUS REG, SOF INT, BCAST REG and RECEIV REG. The signal LOAD BLR is an input write control signal and is used for loading a number into the broadcast limit register 45 from the sub-system bus. The functions of CLEAR STATUS REG and SOF INT have already been described hereinbefore. The start of frame interrupt SOFT INT is also supplied to all other MFIs through the major function bus by transmission through a differential output buffer 199, enabled by the signal MASTER, to a pair of lines 100 of the major function bus (allocated to major function interrupt 0, MFINT 0), and reception through a differential input buffer 101 enabled by the inversion of the signal MASTER by means of an inverter 102. The SOF INT line within each MFI is connected directly to the subsystem bus SSB of the major function so that SOF INT can be received directly within all major functions.

Figure 18:
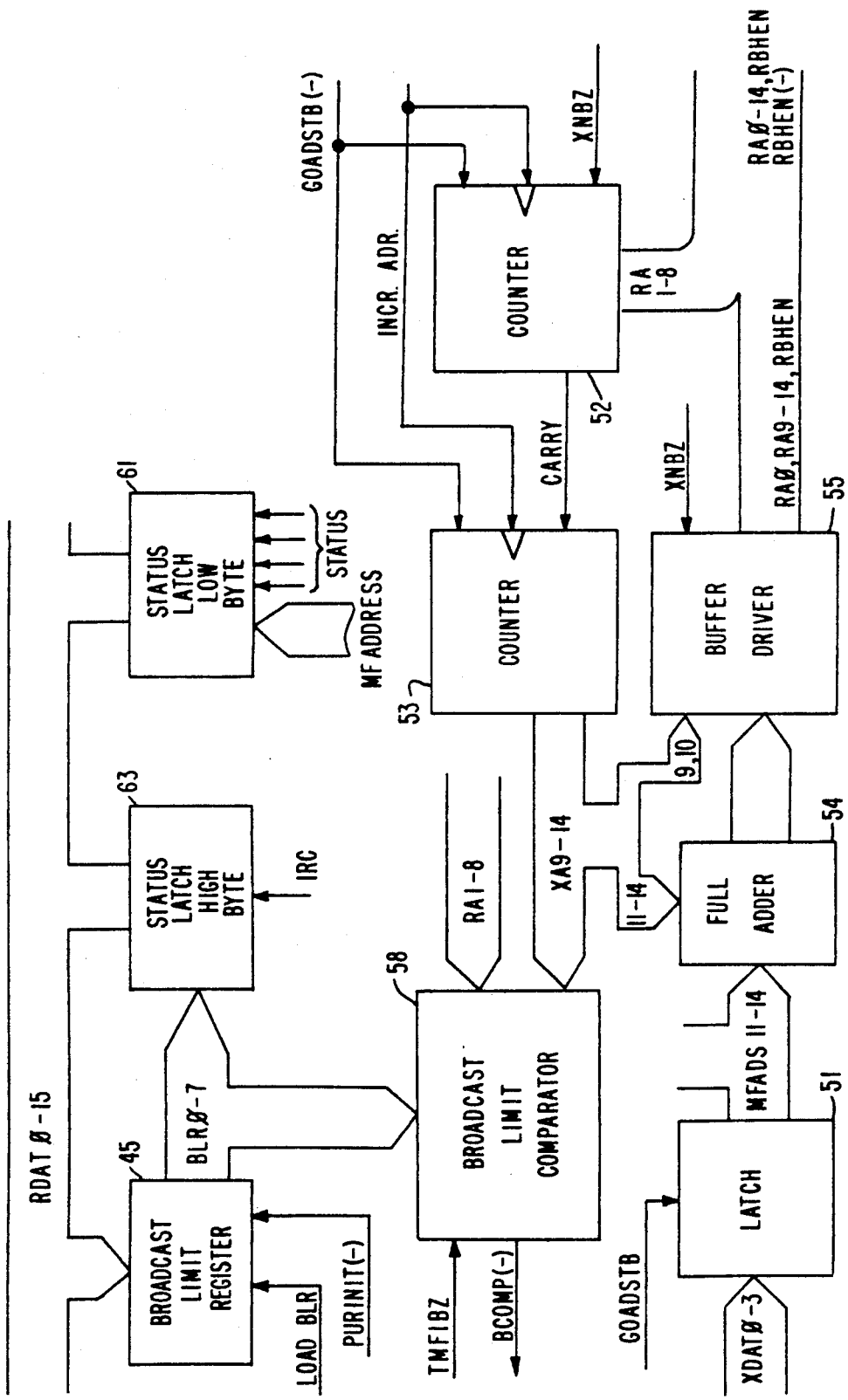

FIG. 18 shows the address generator in more detail. A low active signal GOADSTB(−), which is active whenever GOADSTB is active, is supplied as a clearing signal to the two counters 52 and 53. The carry output of the counter 52 is connected to the clock enabling input of the counter 53, and the signal INCR.ADR. produced by the circuit of FIG. 10 is supplied as the clock signal to both counters 52 and 53. The signal XNBZ, which is active whenever the activated master state machine is not active, disables the outputs of counter 52 from lines RA1 to RA8 of the internal address bus RA. When the master state machine is active, the outputs of counter 52 are enabled onto lines RA1 to RA8 by the low state of XNBZ, and both counters 52 and 53 are cleared at the beginning of each odd numbered state of the master state machine cycle. Each successively active slave state machine can then clock the counters 52 and 53 with either the locally developed signal VALIDSTB(−) or the directly supplied signal RD(−).

The count in the counter 52 is applied directly to the eight lines RA1 to 8 of the internal address bus RA, which consist of sixteen lines RA0 to 14 and RBHEN. The lines RA0, RA14 and RBHEN are connected to the chip selecting logic 141 (FIG. 3). The counter 53 is also an eight bit counter. The first two bits of its count are supplied to the first two lines XA9 and 10 of a cross talk address bus XA, consisting of lines XA9 to 14, and these two lines are connected directly to the first two input pins of the buffer driver 55. The buffer driver 55 supplies lines RA0, RA9 to 14 and RBHEN of the internal address bus RA. The first two lines XA9 and 10 from the counter 53 are arranged to drive the lines RA9 and 10 of the internal address bus RA through the buffer driver 55. The signal XNBZ is supplied to disable the buffer driver 55, so that its output drives lines of the internal address bus RA only when the activated master state machine is active. The signals on lines RA0 and RBHEN are held low by grounding of the corresponding two inputs of the buffer driver 55. This is done because the cross talk memory matrix 140 is, in the present example, an arrangement of four eight-bit RAMs adapted to store sixteen bit words. Which pair of RAMs is addressed is determined by the status of the signal on RA14. The inputs to the buffer driver 55 for the lines RA11 to RA14 are supplied by the full adder 54 which produces the sum of the binary number on lines XA11 to 14 of the cross talk address bus XA from the counter 53 with the binary number on the major function address bus MFADS from the latch 51. The signal GOADSTB enables the latch 51 which may be a type 74LS75 circuit.

CLock pulses cease to be supplied to the counters 52 and 53 when the active slave state machine receives the signal BCOMP(−) from the broadcast limit comparator 58 in the broadcasting MFI, this comparator 53 being enabled by the concurrent presence of the signal TMFIBZ and high levels on the lines RA1 to RA6. THe comparator 58 compares the eight bits of the broadcast limit register output bus BLR with the eight bits on the lines RA7 and 8 and XA9 to 14. When these two sets of eight bits match and TMFIBZ and RA1 to 6 are all high, the comparator 58 issues BCOMP(−). This condition for the issuing of the broadcast complete signal BCOMP(−) allows the highest word address in the allocated cross talk memory area to be immediately below a word level which is an integer multiple of sixty four words. Each RAM of the cross talk memory matrix 140 is addressed by lines RA1 to 13. Lines RA0 and RBHEN are used to enable the low and high bytes respectively of each word. The line RA14 is used to select the lower or higher 16 kilobytes of the total of 32 kilobytes. Lines RA1 to 13 provide the addresses within each of these 16 kilobyte divisions for the 8192 words, which are organised as two blocks of 8192 bytes, each held in a respective 8 kilobyte chip addressed by RA1 to 13. Thus the word addresses are given by lines RA1 to 14. The lines RA1 to 6 are all high at each 63rd work from zero. Thus the present example had 64 word granularity i.e. minimum block length. In the present example, each major function is allocated an area which is 1024 words or a multiple of 1024 words, and the activated master state machine generates the full set of sixteen initial addresses which, in hexadecimal notation, re O to F supplied as four binary bits to the latch 51. The four output bits of the full adder 54 drive the address lines RA11, RA12, RA13 and RA14, and thus determine which 1024 word area is being addressed, since RA11 is the bit for $2^{10}$ words. The signal on line RA14 is logic O for the first 8192 words, and logic 1 for the next 8192 words, the address of the first word being logic 0 on all lines RA1 to 14. The signals on the lines XA11 to 14 determine the relative values of the signals on lines RA11 to 14. The signals on the lines MFADS 11 to 14 from the latch 51 determine the starting level for each allocated area of the cross talk memory. If the allocated areas are all no more than 1024 words, lines XA12, XA13 and XA14 are always logic 0.

The size of an allocated area of cross talk memory is indicated by the largest number which appears on the combination of the lines RA1 to 8 and XA9 to 14. Since the allocated areas have 64 word granularity, their largest number always has lines RA1 to 6 high. Therefore the concurrence of TMFIBZ high and RA1 to 6 high is used to enable the comparator 58, and the comparator 58 compares the number on lines RA7 and 8 in combination with lines XA9 to 14 with the number stored in the broadcast limit register 45.

Figure 19:
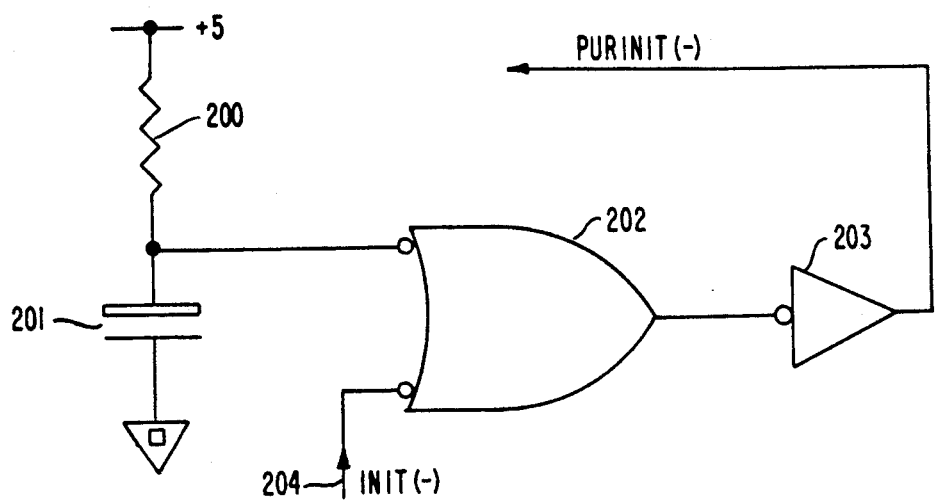

In the present embodiment, the broadcast limit register 45 is cleared, at power up, by a signal PURINIT(−) which is active at power up. FIG. 19 shows the circuit which produces PURINIT(−). This circuit has a series combination of a resistor 200 and a capacitor 201 connected between a 5 volt power supply line and data ground. The junction of the combination is connected to one input of an OR gate 202 with inverted inputs. Since the resistor 200 is connected to the power supply line, this input of the gate 202 is held low at power up, until the capacitor 201 charges up. Consequently the output of the gate 202 is initially high and is inverted by an inverter 203 to produce the low active signal PURINIT(−). The other input of the gate 202 is a signal INIT(−) supplied from a line 204 connected to the sub-system bus and shown in FIG. 20. The signal PURINIT(−) is produced either after power up or when an active INIT(−) signal is received from the sub-system bus.

Figure 20:
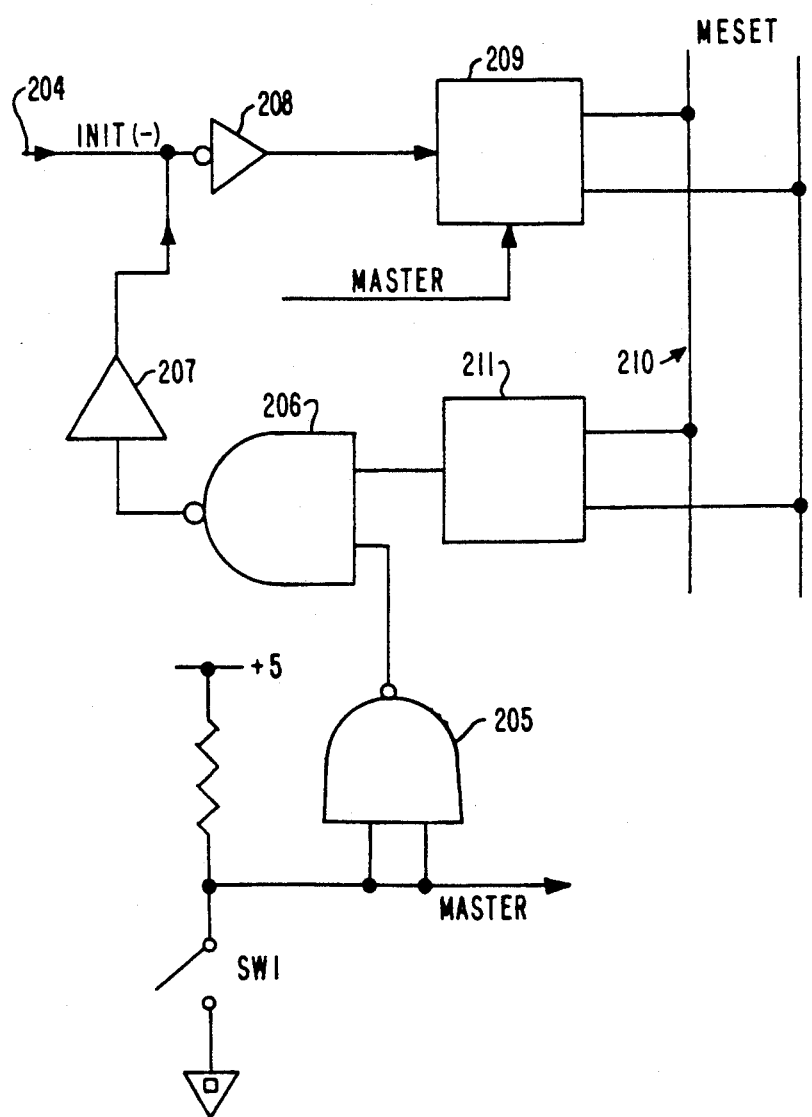

In the master MFI, the switch SW1 is open as shown in FIG. 20 and the signal MASTER is active. Consequently the output of an inverter 206 is low and the output of an AND gate 206 with inverted output is high. The output of the gate 206 is supplied to the line 204 through an open collector buffer 207 or equivalent buffer circuit. Hence if the line 204 is not pulled low at the sub-system bus, an inverter 208 supplies a high signal to a differential output buffer 209 enabled by MASTER. A corresponding signal MESET is supplied by the buffer 209 to a pair of lines 210 of the major function bus. These lines are connected to a differential input buffer 211 in each MFI which supplies one input to the AND gate 206, which is blocked in the master MFI but open in each slave MFI, since MASTER is not active there, the switch SW1 being closed. The output from the buffer 211 in each slave MFI is a replica of the input to the buffer 209 in the master MFI. Consequently, if the line 204 is high in the master MFI, it is high in the slave MFIs. If the sub-system bus in the major function with the master MFI pulls the line 204 low, the input to the buffer 209 goes high, the outputs from the buffers 211 in the slave MFIs go high, and the lines 204 in the slave MFIs go low.

Active PURINIT(−) also clears the error latch 195 (FIG. 13a), the enable slave start latch 157 (FIG. 5) and the master state machine memory 46' (FIG. 4).

The major function address comparator 44 (FIG. 5) can be disabled by a signal BROADCAST DISABLE(−) which is set by a latch 21, shown in FIG. 16, when the SOF decoder 262 decodes BCAST REG and RDAT 0 is clocked into the latch 212. The non-inverted output of the latch 212 is supplied as one bit to the low byte status latch 61 (FIG. 18). Similarly, the validating circuit 50 (FIG. 10) can be disabled by a signal RECEIVE DISABLE (−) which is set by a latch 213, shown in FIG. 16, when the SOF decoder 262 decodes RECEV REG and RDAT 0 the latch 213. The non-inverted output of the latch 213 is also supplied as one bit to the low byte status latch 61. The eight bits in the latch 61 are the four bits making up the major function address, the broadcast and receive disable bits, and the parity and cross talk error bits from the error latch 195 (FIG. 13a).

Figure 23:
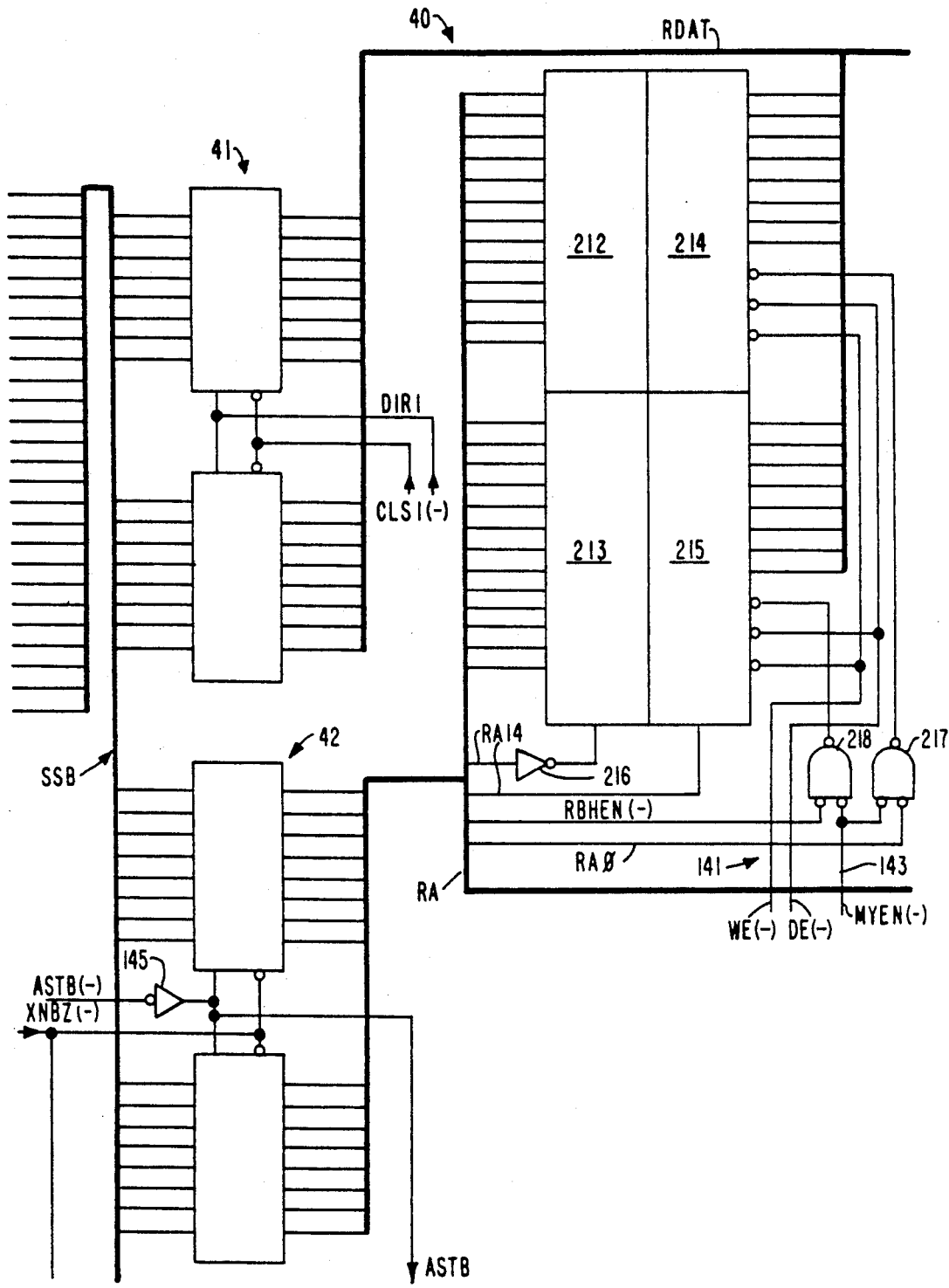

FIG. 23 shows in more detail part of the circuitry of FIG. 3. The memory matrix 140 consists of four RAM chips 212 to 215 of 8 kilobytes capacity, each addressed by the lines RA1 to RA13 of the internal address bus. Each chip has two, complementary chip select input pins. The high active chip select pins of chips 212 and 213 are driven from RA14 through an inverter 216, and the high active chip select pins of chips 214 and 215 are driven directly by RA14. This arrangement divides the memory matrix 140 into higher and lower 8 kiloword areas. The low active chip select pins of chips 212 and 214 are driven by the output of negative logic AND gate 217 which has two inputs connected respectively to RA0 and to the decoder and control logic unit 43 which supplies a signal MYEN(−). Consequently the chip 212 or 214 is enabled when RA0(−) and MYEN(−) are active. RA)(−) is active whenever the buffer driver 55 is enabled and NEMFIBZ is active, or when access is required to the even byte bank from the sub-system bus when NEMFIBZ is inactive. The low active chip select pins of chips 213 and 215 are driven by the output of another negative logic AND gate 218 which has two inputs connected respectively to RBHEN and to the unit 43 to receive MYEN(−). Consequently the chip 213 and 215 is enabled when RBHEN(−) and MYEN(−) are active. RBHEN(−) is active whenever the buffer driver 55 is enabled and NEMFIBZ is active, or when access is required to the odd byte bank from the sub-system bus when NEMFIBZ is inactive. The inverter 216 and the gates 217 and 218 form the chip select logic 141 of FIG. 3. The output pins of the chips 212 and 214 are connected to lines RDAT 0 to 7, and the output pins of the chips 213 and 215 are connected to the lines RDAT 8 to 15. The write enable and output enable pins of each of the chips 212 to 215 are connected respectively to the two output pins of the multiplexer 142 shown in FIGS. 3 and 24 to receive respectively either VALIDSTB(−) and RD(−) or MWC(−) and MRD(−).

The data buffer 41 is formed by two type 74LS640 two way buffers. The address buffer 42 is formed by two tri-state latch circuits, type AM 74LS533.

Figure 24:
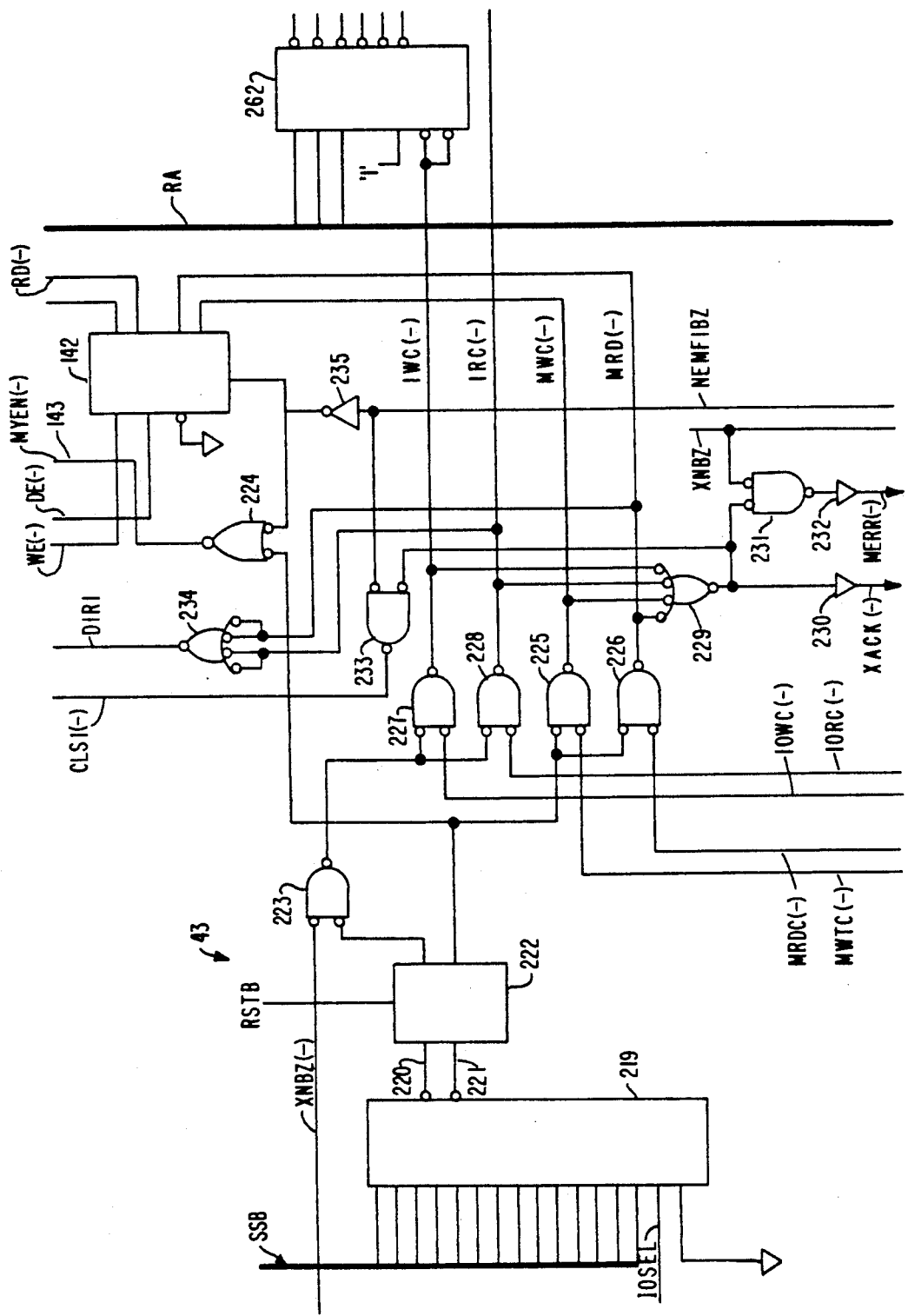

FIG. 24 shows the decoder and selection logic unit 43 in detail, the multiplexer 142 and the SOF decoder 262.

The unit 43 includes a decoder 219 which receives addresses and an input/output select signal IOSEL from the sub-system bus SSB. The decoder 219 has two outputs 220 and 221, one for input/output functions and the other for memory functions respectively. Signals on these outputs 220 and 221 are latched by a latch (type 74LS75) 222 enabled by the signal ASTB from the inverter 145 (FIG. 23). Input/output function selection is gated by a negative logic AND gate 223 enabled by XNBZ(−). Memory function selection signals from the latch 221 pass directly to a negative logic OR gate 224 which supplies the signal MYEN(−) to the chip selection logic 141, and directly to two negative logic AND gates 225 and 226. The gate 225 produces MWC(−) when supplied a memory function selection signal by the latch 222 and a memory write control signal MWTC(−) by the sub-system bus SSB. The gate 226 produces MRD(−) when supplied a memory function selection signal by the latch 222 and a memory read control signal MRDC(−) by the sub-system bus.

A negative logic AND gate 227 produces the input write control signal IWC(−), which is supplied to the SOF decoder 262, when supplied an input/output selection signal by the gate 223 and an input/output write control signal IOWC(−) by the sub-system bus. FOr loading a broadcast limit number into the broadcast limit register, IWC(−) is active. To allow the major function to read the status latches 61 and 63, another negative logic AND gate 228 produces the signal IRC(−) when supplied with an input/output selection signal by the gate 223 and an input /output read control signal IORC(−) by the sub-system bus.

ANy output from the gates 225 to 228 is returned to the sub-system bus as XACK(−) through a negative logic OR gate 29 and an open collector buffer 230. If XACK(−) is generated at the same time as XNBZ is not active, i.e. if the sub-system bus attempts to access the memory matrix 140 or an input/output function, then another negative logic AND gate 231 produces, through an open collector buffer 232, a memory error signal MERR(−) which is supplied to the sub-system bus. The signal XACK(−) is also supplied as one input to a negative logic AND gate 233 which receives NEMFIBZ as an input. The output from gate 233 is the control logic signal CLS1(−) which enables the data buffer 41. Thus the data buffer 41 is enabled whenever there is both no cross talk and any one of the gates 225 to 228 is producing an active signal. The direction control signal DIR1 for the data buffer 41 is produced by a negative logic OR gate 234 which receives IRC(−) and MRD(−) as inputs.

An inverter 235 produces NEMFIBZ(−) for the memory function multiplexer 142. The OR gate 224 which receives the memory function selection signals from the latch 222 also receives NEMFIBZ(−), so that MYEN(−) is active when either the latch 222 produces an active memory function selection signal or NEMFIBZ is active. Thus the multiplexer 142 is enabled when access to memory is required by the sub-system bus or by the slave state machine of this MFI or from the major function bus by another MFI. Since the signal paths through the multiplexer 142 and the enabling of the data buffer 41 are controlled by NEMFIBZ, the sub-system bus is over-ridden at any coincidence of access demands.

Figure 25:
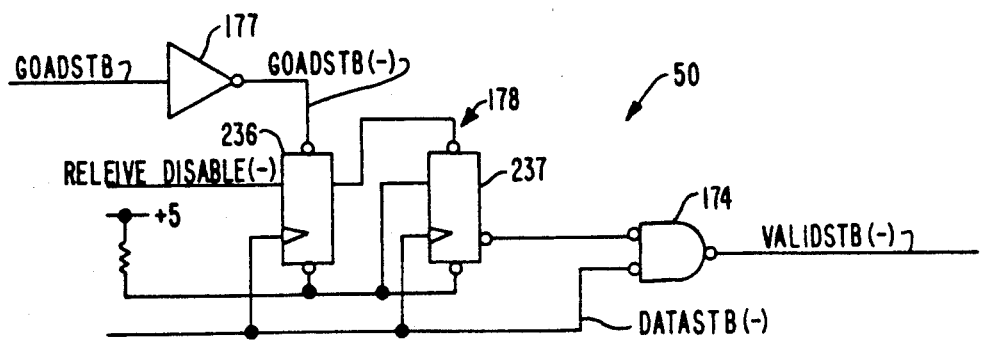

FIG. 25 shows the validating circuit 50 of FIGS. 2 and 10 in more detail. The counter 178 is formed by two D flip flops 236 and 237, which receiver DATASTB(−) as clock signal. The signal RECEIVE DISABLE(−) is not normally active, and is therefore high, so that both flip flops 236 and 237 receive high inputs at their D input pins, and are normally in their set conditions so that the AND gate 179 is enabled by the complementary output from the second flip flop 237. The signal DATASTB(−) is active whenever the signal READ of a broadcasting slave state machine is active, and consequently is active in states 15, 17, 19 and 21. States 15 and 16 are repeated in a loop until a broadcast is complete. The signal GOADSTB(−) is active immediately before any slave broadcast begins, and therefore the flip flop 236 resets immediately before a slave broadcast, and thereby also resets the flip flop 237. The complementary output from the flip flop 237 in its reset state is high, so that the gate 179 is blocked. The first active DATASTB(−) sets the first flop 236 but not the second flip flop 237 since the output from the first flop 236 is still low when the first active DATASTB(−) reaches the second flip flop 237. The second active DATASTB(−) sets the second flip flop 237 but does not pass through the gate 179 since at the time that it reaches the gate 179 the complementary output from the second flip flop 237 is still high. Thus the first two active DATASTB(−) signals do not produce VALIDSTB(−) signals.

Figure 26:
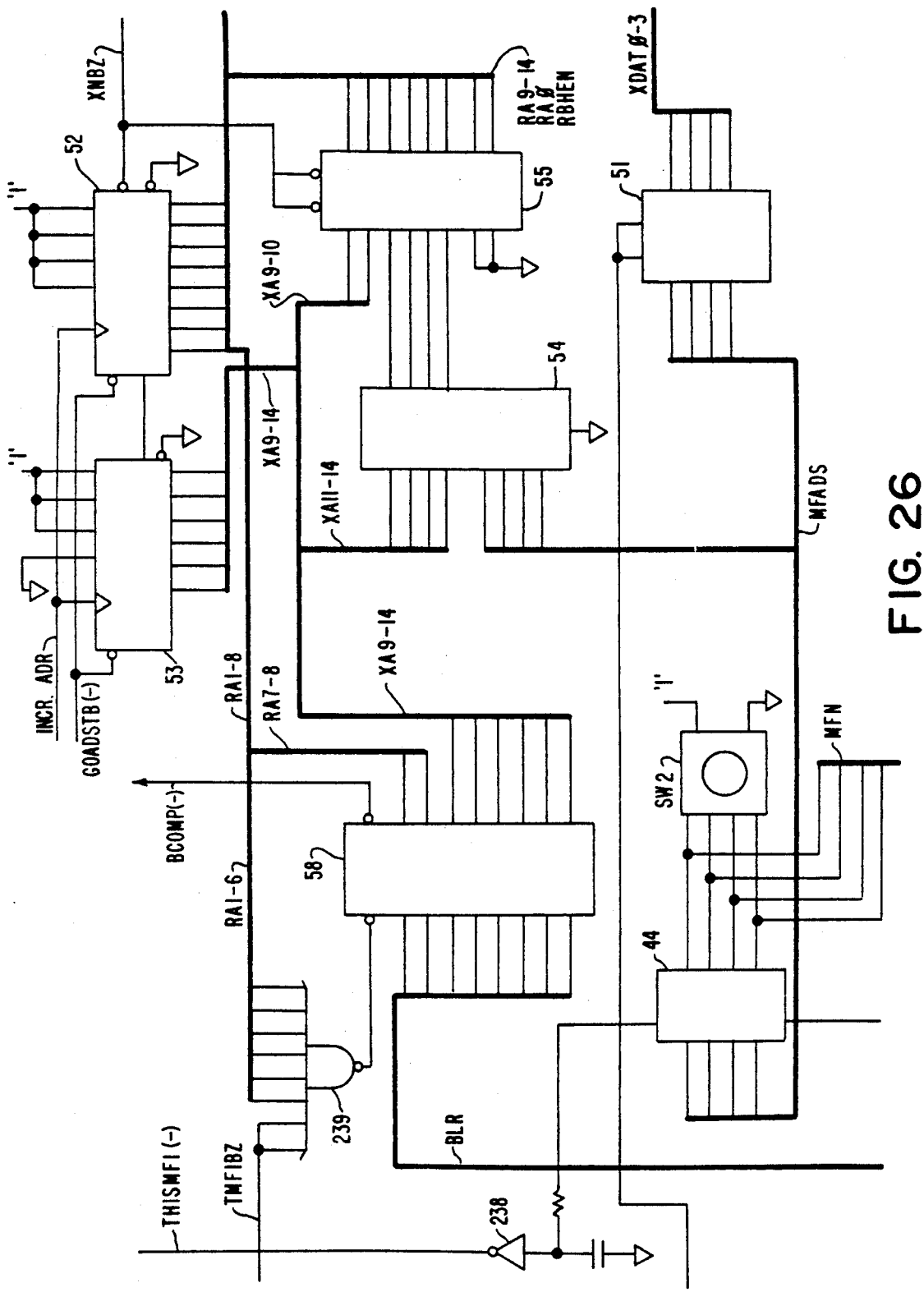

FIG. 26 shows in more detail the circuitry of the address generator. In the present example the major function address comparator 44 is a type 74LS85 circuit having its output pin coupled through a resistor and capacitor combination to an inverter 238 such as type 74LS240 t produce the signal THISMFI(−). The broadcast limit comparator 58 consists of a type AM 25LS2521 circuit with its enable pin receiving the output from an eight input coincidence gate 239 which produces a low active signal when TMFIBZ is active and lines RA1 to 6 are all high. The buffer driver 55 is a type 74LS244 which has the input pins corresponding to the outputs for RA0 and RBHEN connected to data ground. The counters 52 and 53 are type 74LS593 circuits. Pin 18 of counter 52 receives the signal XNBZ, produced by an inverter (not shown) driven by XNBZ(−). Pin 14 of counter 52 is connected to data ground. Pins 12 and 11 are connected respectively to the output of the inverter 177 of FIG. 25 and pin 14 of counter 53. Pins 18 and 12 of counter 53 are connected respectively to data ground and the output of inverter 177. Pin 11 of counter 53 is not used. Pin 15 also of counter 53 is connected to data ground.

Figure 27:
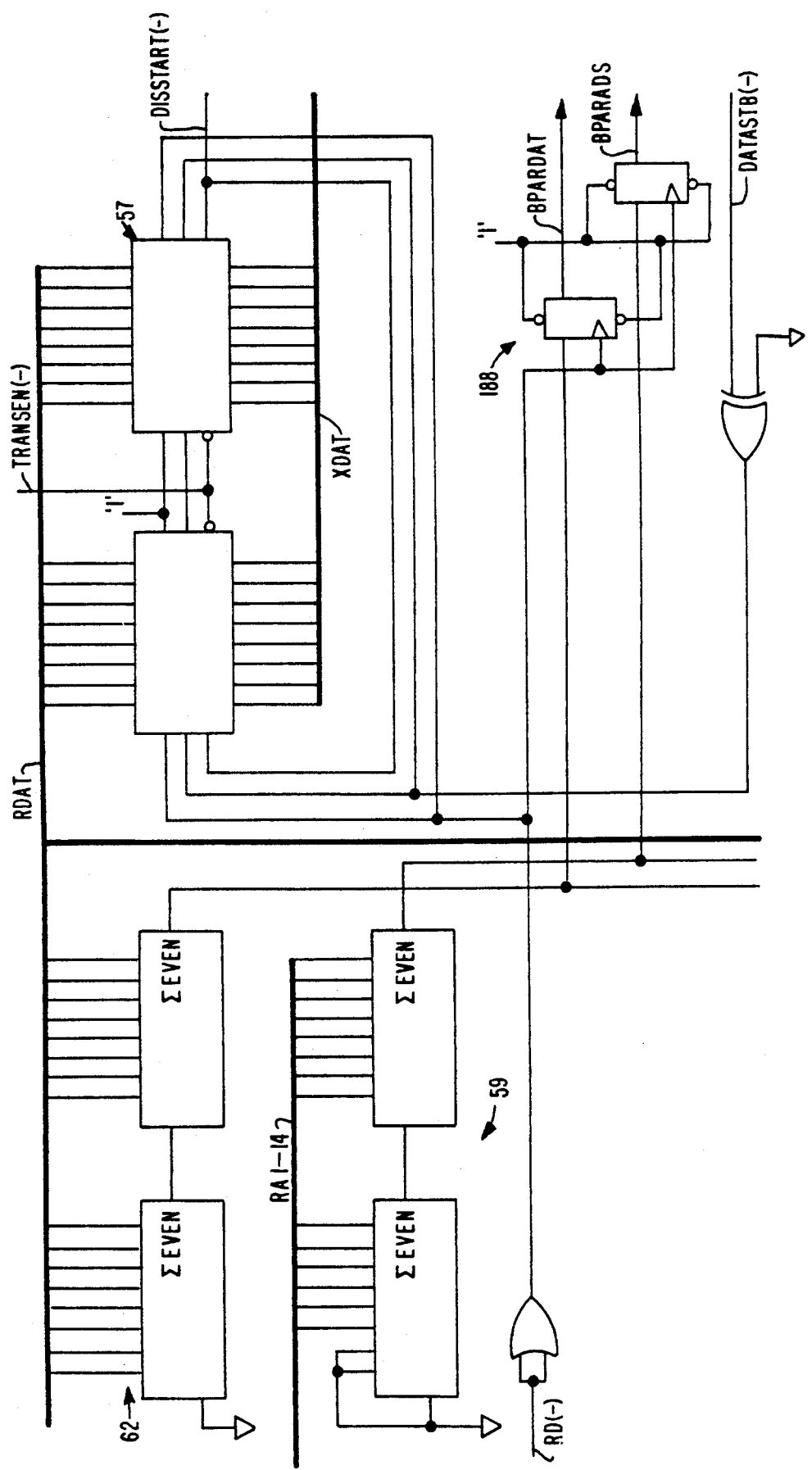

FIG. 27 shows the data buffer 57, the parity generators 59 and 62, and the latch 188 of FIG. 13b. The data buffer 57 consists of two type 74LS646 circuits having their enabling input pins connected to receive TRANSEN(−), and their pins 2 and their pins 22 connected, with the pins 2 receiving logic 1 as indicated. The parity generators 59 and 62 both consists of two type 74S280 circuits. The latch 188 is formed by two D flip flops, type 74LS74, acting independently on the outputs from the two parity generators 59 and 62.

Figure 28:
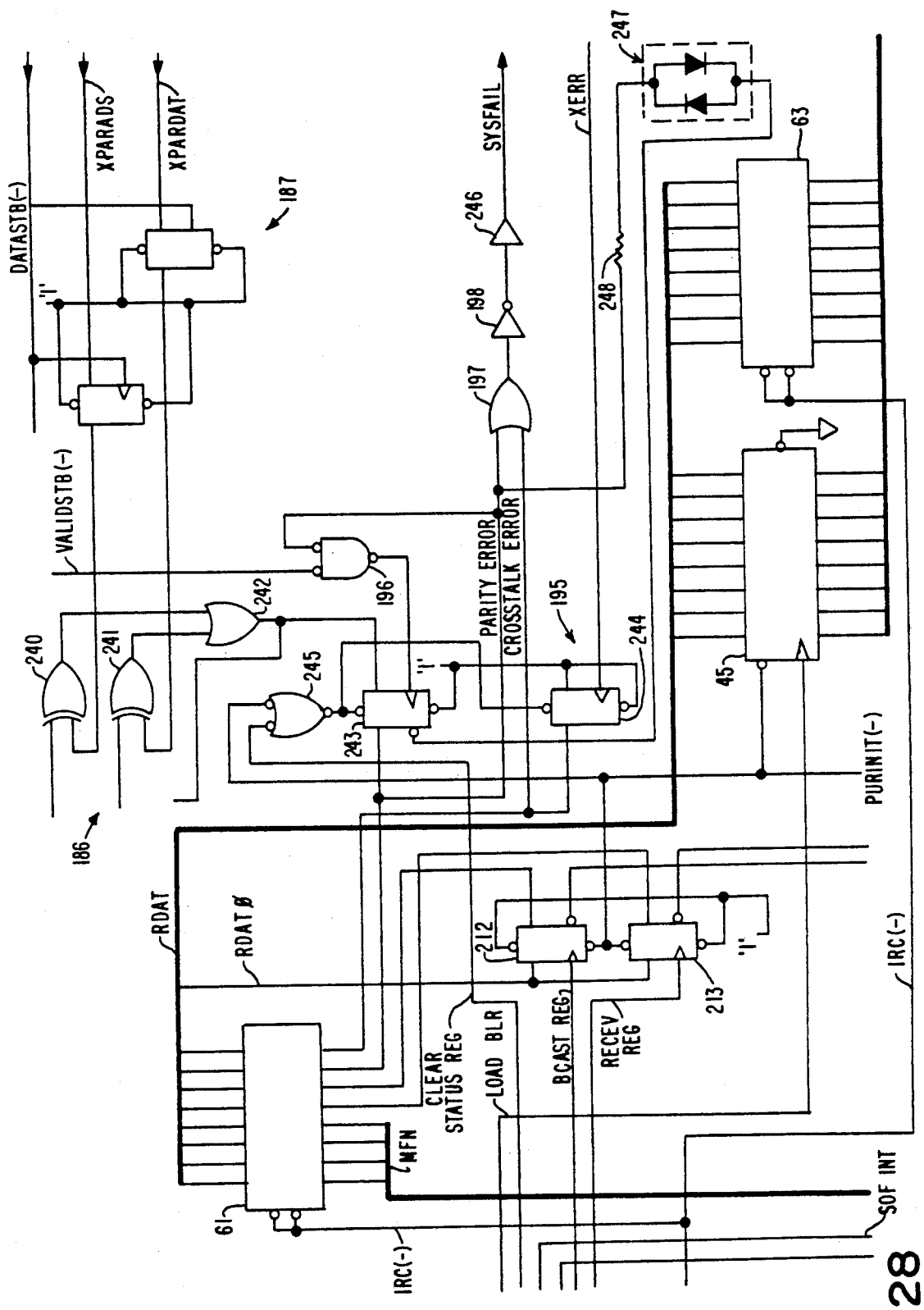

FIG. 28 shows the parity latch 187, parity comparator 186, error latch 195, latches 212 and 213 of FIG. 16, the status latches 61 and 63 and the broadcast limit register 45 of FIG. 18, and associated circuitry. The parity comparator 186 is formed by two exclusive-OR-gates 240 and 241, and an OR-gate 242. The parity latch 187 is formed in the same way as the latch 188 in FIG. 27. The error latch 195 also has two D flip flops, 243 and 244, but includes a negative logic OR gate 245 supplying its output to the reset inputs of the flip flops 243 and 244 and driven by the signal PURINIT(−) and the signal CLEAR STATUS REG from the SOF decoder 262. The broadcast limit register 45 is a type AM 25LS2520 circuit clocked by LOAD BLR form the SOF decoder 262 and cleared by PURINIT(−). The status latches 61 and 63 are type 74LS244 circuits having pins 1 and 19 driven by IRC(−). The interrupt signal SYSFAIL generated in response to a parity error or to a cross talk error is passed through an open collector buffer 246 to the sub-system bus. The status of the parity error signal produced by the flip flops 243 is visually indicated by a pair of LEDs 247 in series with a resistor 248 between the outputs of the flip flop 243, the LEDs being oppositely poled and emitting respectively green and red light. The LEDs may be PCL 200RG, with the resistor 248 being 620 ohms.

It should be noted that the master state machine and its associated circuitry for generating major function addresses need not be incorporated in any of the major functions but may be constructed as a separate unit connected to the major function bus.

Although the particular embodiment of the invention described hereinbefore is for use in a flight simulator, other embodiments may be used in other contexts. For example, the control of a chemical process plant may be analysed into a number of major functions and a computing system embodying the invention be adapted to monitor and control the plant. Similarly, other industrial processes may be monitored and controlled. Furthermore, an unmanned vehicle such as an unmanned spacecraft may be controlled by a computing system embodying the invention.

We claim:

1. A computing system comprising a common bus, a plurality of processing units coupled to said common bus, and means for generating a start signal at times separated by regular intervals, each of said units including a memory means organized into regions allocated to the plurality of processing units for storing data processed by the plurality of units, means for reading the data in the region allocated to that unit and in at least one other region, means for writing data updated by the activity of that unit into the region allocated to that unit and into no other region, means for placing on said bus data stored in the region allocated to that unit, and means for writing data placed on the bus by the other units into the other regions, each processing unit being adapted to carry out predetermined operations during each of said regular intervals, said operations including writing data placed on said bus by the respective other units into said other allocated regions, and placing the data stored in the region allocated to that unit on said bus and wherein at least one of the units includes means for causing during a portion of each of said regular intervals each of the units in succession to place on said bus the data written into the respective allocated region during the previous one of said regular intervals.

2. A computing system according to claim 1, wherein the means for causing each unit to place said data on said common bus issues a plurality of signals in a predetermined order and each unit includes means for responding to a respective one of said signals by reading onto said common bus the data stored in the region allocated to that unit.

3. A computing system according to claim 2, wherein each unit includes means for generating the memory addresses for data placed on the said bus by any of the units from the respective allocated region.

4. A computing system according to claim 2, wherein each unit has a respective bus and the respective memory means is included in circuit which interfaces the respective bus to the common bus.

5. A computing system according to claim 4, wherein each unit has a plurality of circuits each connected to the respective bus of the unit and dedicated to a respective function within the unit.

6. A computing system according to claim 2, wherein at least one of the units has a circuit controlling output means.

7. A computing system according to claim 2, wherein at least one of the units has a circuit receiving signals from input means.

8. A computing system according to claim 2, wherein each unit is adapted to carry out processing relating to a respective sub-division of flight simulation.

9. A computing system according to claim 8, wherein there are five units and the respective sub-divisions of flight simulation are aircraft movement, engine operation, geographical flight path, aircraft equipment systems behaviour, and instructor entered data.

10. A computing system according to claim 9, wherein the aircraft movement unit is connected to means providing signals representative of movement of mechanically operable aircraft direction control members, and to means for moving a simulated cockpit in accordance with computed aircraft motion signals developed by the aircraft movement unit.

11. A computing system according to claim 10, wherein the simulated cockpit is provided with means for displaying a simulated field of view, and the aircraft movement unit or the geographical flight path unit is connected to means for generating display control signals controlling the displaying means in accordance with field of view data related to the simulated geographical flight path.

12. A computing system according to claim 11, wherein a management computer is coupled to each unit by a local area network so as to allow the management computer to load programs into the units.

13. A computing system according to claim 12, wherein the management computer is coupled to each unit by another local area network so as to allow debugging of programs in the units from the management computer.

14. A computer system according to claim 2, wherein each of the processing units is constructed as a standard module.

* * * * *